(12) United States Patent
Abileah et al.

(10) Patent No.: US 6,169,590 B1
(45) Date of Patent: Jan. 2, 2001

(54) LIQUID CRYSTAL DISPLAY WITH OPTICAL COMPENSATOR

(75) Inventors: Adiel Abileah, Farmington Hills; Gang Xu, Royal Oak; Patrick F. Brinkley, Bloomfield, all of MI (US)

(73) Assignee: OIS Optical Imaging Systems, Inc., Northville, MI (US)

(*) Notice: Under 35 U.S.C. 154(b), the term of this patent shall be extended for 70 days.

(21) Appl. No.: 08/881,667

(22) Filed: Jun. 24, 1997

Related U.S. Application Data

(62) Division of application No. 08/595,068, filed on Feb. 1, 1996, and a division of application No. 08/451,962, filed on May 26, 1995, now Pat. No. 5,818,615, and a division of application No. 08/160,731, filed on Dec. 2, 1993, now Pat. No. 5,499,126.

(51) Int. Cl.⁷ .................................................. G02F 1/1335
(52) U.S. Cl. ............................................ 349/120; 349/119
(58) Field of Search ........................................ 349/119, 120

(56) References Cited

U.S. PATENT DOCUMENTS

| | | |
|---|---|---|
| 3,537,008 | 10/1970 | Lakatos . |
| 3,900,248 | 8/1975 | Nagasaki . |
| 4,385,806 | 5/1983 | Fergason . |
| 4,436,379 | 3/1984 | Funada et al. . |
| 4,632,514 | 12/1986 | Ogawa et al. . |
| 4,652,088 | 3/1987 | Kando et al. . |
| 4,674,841 | 6/1987 | Buzak . |
| 4,686,519 | 8/1987 | Yoshida et al. . |
| 4,701,028 | 10/1987 | Clerc et al. . |
| 4,844,569 | 7/1989 | Wada et al. . |
| 4,852,976 | 8/1989 | Suzuki . |
| 4,889,412 | 12/1989 | Clerc et al. . |
| 4,909,606 | 3/1990 | Wada et al. . |
| 4,957,349 | 9/1990 | Clerc et al. . |
| 4,973,137 | 11/1990 | Kozaki . |
| 4,984,874 | 1/1991 | Yamamoto et al. . |
| 4,991,941 | 2/1991 | Kalmanash . |
| 4,995,704 | 2/1991 | Yamamoto et al. . |
| 5,018,839 | 5/1991 | Yamamoto et al. . |
| 5,032,008 | 7/1991 | Yamamoto et al. . |
| 5,071,997 | 12/1991 | Harris . |
| 5,107,356 | 4/1992 | Castleberry . |
| 5,124,824 | 6/1992 | Kozaki et al. . |
| 5,132,826 | 7/1992 | Johnson et al. . |
| 5,136,405 | 8/1992 | Wada et al. . |
| 5,138,474 | 8/1992 | Arakawa . |
| 5,150,235 | 9/1992 | Haim et al. . |
| 5,150,237 | 9/1992 | Iimura et al. . |
| 5,157,529 | 10/1992 | Koopman et al. . |
| 5,179,457 | 1/1993 | Hirataka et al. . |
| 5,184,236 | 2/1993 | Miyashita et al. . |
| 5,189,538 | 2/1993 | Arakawa . |
| 5,196,953 | 3/1993 | Yeh et al. . |
| 5,229,039 | 7/1993 | Ikeda et al. . |
| 5,231,521 | 7/1993 | Johnson et al. . |
| 5,235,612 | 8/1993 | Stilwell et al. . |
| 5,237,438 | 8/1993 | Miyashita et al. . |

(List continued on next page.)

FOREIGN PATENT DOCUMENTS

| | | |
|---|---|---|
| 0525473 | 7/1991 | (EP) . |
| 55-45037 | 3/1980 | (JP) . |
| 313916 | 1/1991 | (JP) . |

*Primary Examiner*—James A. Dudek
(74) *Attorney, Agent, or Firm*—Laff, Whitesel & Saret, Ltd.

(57) ABSTRACT

A multi-colored pixel for a twisted nematic liquid crystal display including red, green, and blue subpixels, wherein each subpixel includes a pair of substrates, a pair of polarizers, opposing electrodes, and a color personalized retardation film which compensates for the different wavelength of each color. The personalized retardation films of the different color subpixels results in elimination of the multi-gap approach and substantially eliminates the problem of different color leakages at different viewing angles, including normal. Also, one polymer based element, preferably a polyimide, functions as both a color filter and a retardation film in certain embodiments of this invention.

7 Claims, 19 Drawing Sheets

U.S. PATENT DOCUMENTS

| | | |
|---|---|---|
| 5,243,455 | 9/1993 | Johnson et al. . |
| 5,250,214 | 10/1993 | Kanemoto et al. . |
| 5,311,339 | 5/1994 | Fertig et al. . |
| 5,325,218 | 6/1994 | Willet et al. . |
| 5,342,545 | 8/1994 | Yamada et al. . |
| 5,344,916 * | 9/1994 | Harris et al. .......................... 349/120 |
| 5,381,253 | 1/1995 | Sharp et al. . |
| 5,406,587 | 4/1995 | Horwitz et al. . |
| 5,418,814 | 5/1995 | Hulbert . |
| 5,548,427 | 8/1996 | May . |
| 5,589,963 | 12/1996 | Gunning, III et al. . |

\* cited by examiner

FIG. 11
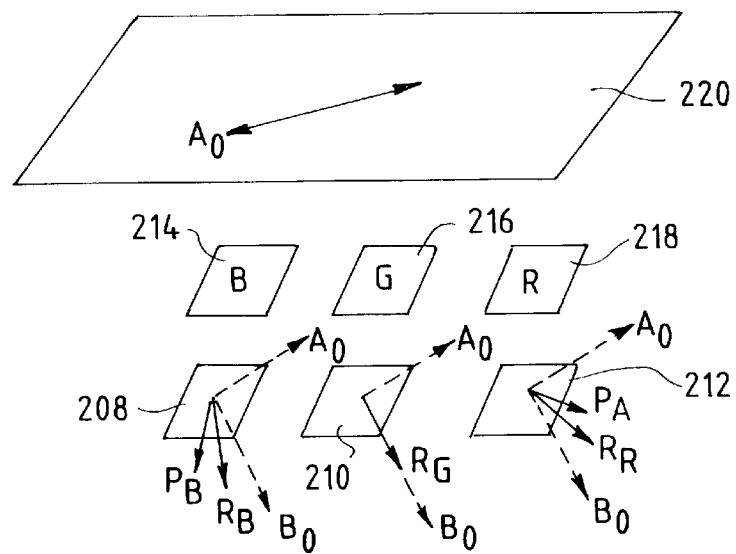
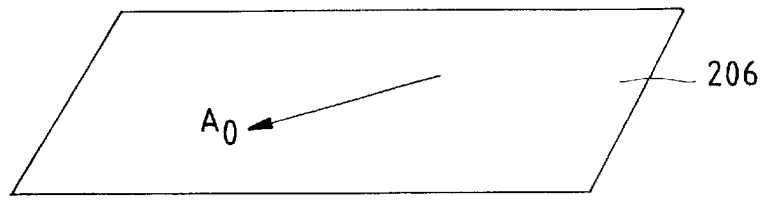
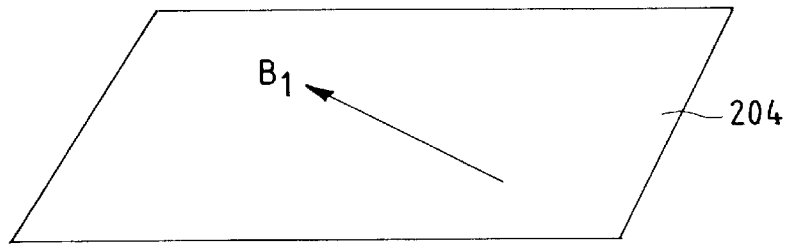
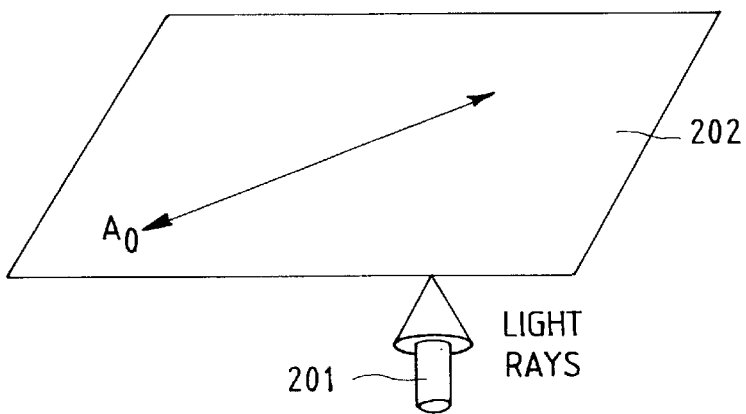

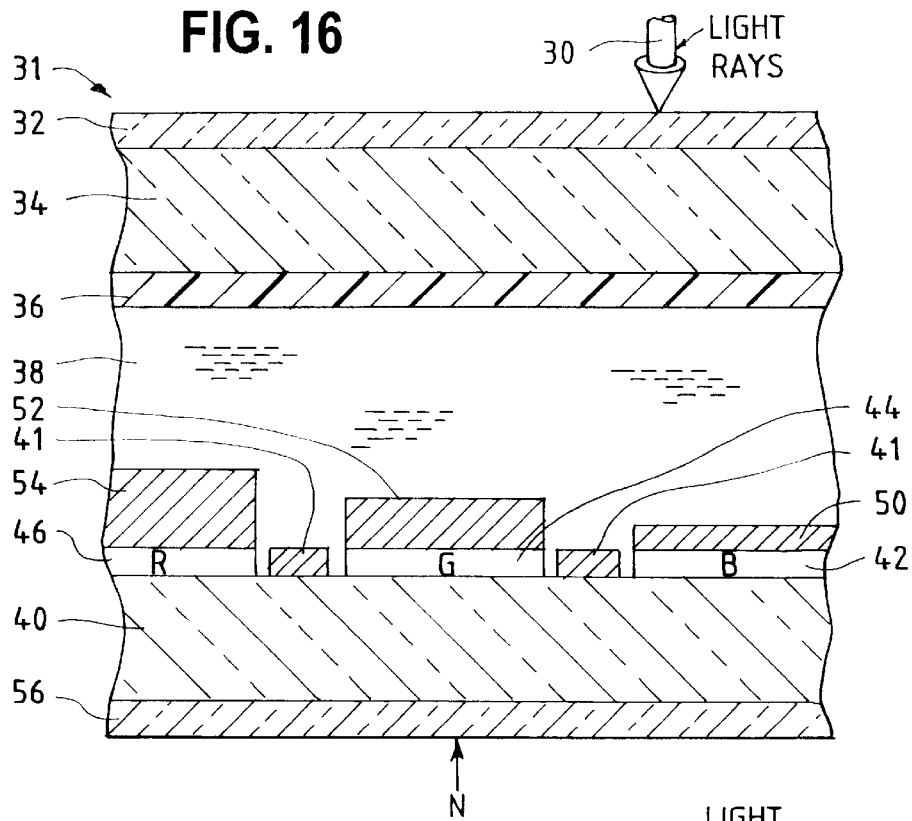
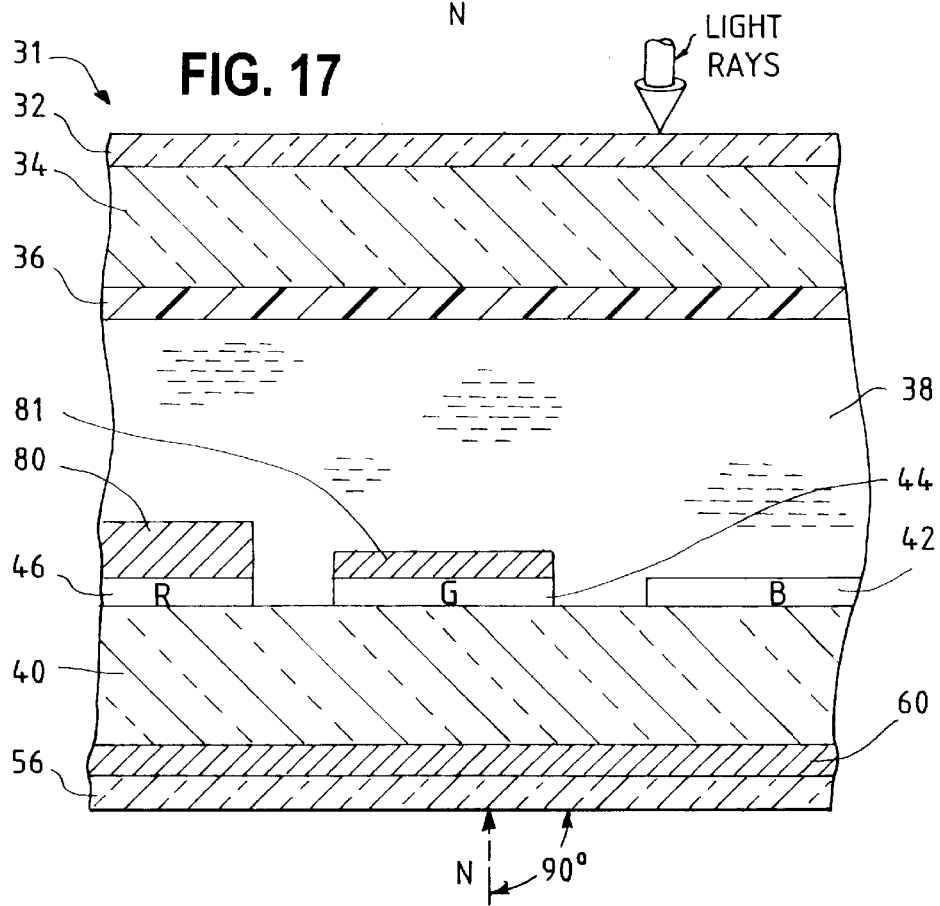

Yang – VERTICAL ANGLE
Xang – HORIZONTAL ANGLE

LIQUID CRYSTAL DISPLAY WITH OPTICAL COMPENSATOR

This application is a division of Ser. No. 08/595,068 filed Feb. 1, 1996 and a division of Ser. No. 08/451,962 filed May 26, 1995 now U.S. Pat. No. 5,818,615 and a division of Ser. No. 08/160,731 filed Dec. 2, 1993 now U.S. Pat. No. 5,499,126.

This invention relates to the design of a liquid crystal display having at least one retardation film therein. More particularly, this invention relates to the design of a polychromatic or multicolored liquid crystal display and techniques for eliminating color leakages and maximizing the field of view of such displays.

BACKGROUND OF THE INVENTION

Liquid crystal materials are useful for electronic displays because light traveling through a layer of liquid crystal (LC) material is affected by the anisotropic or birefringent value ($\Delta N$) of the material, which in turn can be controlled by the application of a voltage across the liquid crystal material. Liquid crystal displays are desirable because the transmission or reflection of light from an external source, including ambient light and backlighting schemes, can be controlled with much less power than was required for the illuminance materials used in other previous displays. Liquid crystal displays are now commonly used in such applications as digital watches, calculators, portable computers, avionic cockpit displays, and many other types of electronic devices which utilize the liquid crystal display advantages of long life and operation with low voltage and power consumption.

The information in many liquid crystal displays is presented in the form of a matrix array of rows and columns of numerals or characters, which are generated by a number of segmented electrodes arranged in such a matrix pattern. The segments are connected by individual leads to driving electronics, which apply a voltage to the appropriate combination of segments to thereby display the desired data and information by controlling the light transmitted through the liquid crystal material. Graphic information in, for example, avionic cockpit applications or television displays may be achieved by a matrix of pixels which are connected by an X-Y sequential addressing scheme between two sets of perpendicular conductor lines (i.e. row and column lines). More advanced addressing schemes use arrays of thin film transistors or diodes which act as switches to control the drive voltage at the individual pixels. These schemes are applied predominantly to twisted nematic liquid crystal displays, but are also finding use in high performance versions of super twisted liquid crystal displays.

Contrast is one of the most important attributes determining the quality of both normally white (NW) and normally black (NB) liquid crystal displays. In normally black (NB) LCDs, the primary factor limiting the contrast achievable in these liquid crystal displays is the amount of light which leaks through the display in the darkened or OFF state. In the NW mode, the primary factor limiting the contrast is the amount of light which leaks through the display in the darkened ON state. This problem is compounded in a bright environment, such as sunlight, where there is a considerable amount of reflected and scattered ambient light. In color liquid crystal displays, light leakage causes severe color shifts for both saturated and gray scale colors. These limitations are particularly important for avionics applications, where copilot viewing of the pilot's displays is important.

In addition, the legibility of the image generated by both normally black (NB) and normally white (NW) liquid crystal devices depends on the viewing angle, especially in a matrix addressed device with a large number of scanning electrodes. Absent a retardation film, the contrast ratio in a typical NB or NW liquid crystal display is usually at a maximum only within a narrow viewing (or observing) angle centered about normal incidence (0° horizontal viewing angle and 0° vertical viewing angle) and drops off as the angle of view is increased.

It would be a significant improvement in the art to provide a liquid crystal display capable of presenting a high quality, high contrast image over a wide field of view.

Several types of liquid crystal pixels or cells are in widespread use in flat panel displays. Active matrix addressing allows such displays to present a full color image with high resolution. When viewed directly at a normal or on-axis viewing angle N (0° vertical viewing angle and 0° horizontal viewing angle), a liquid crystal display provides a generally high quality output especially when the cell gap "d" is matched to the first transmission minimum, but the image degrades and exhibits poor contrast at increased viewing angles. This occurs because liquid crystal cells operate by virtue of the anisotropic or birefringent effect exhibited by a liquid crystal layer which includes a large number of anisotropic liquid crystal molecules. Such a material will be positively uniaxially birefringent (i.e., the extraordinary refractive index is larger than the ordinary refractive index) with an extraordinary refractive index associated with the alignment of the long molecular axes. The phase retardation effect such a liquid crystal material has on light passing through it inherently varies or increases with the inclination angle of light, leading to a lower quality image at larger viewing angles (see, e.g. Penz, Viewing Characteristics of the Twisted Nematic Display, Proceeding of the S.I.D., Vol. 19, p. 43 (1978); Grinberg, et al., Transmission Characteristics of a Twisted Nematic Liquid Crystal Layer, Journal of the Optical Society of America, Vol. 66, p. 1003 (1976)). By introducing an optical compensating element (or retarder) into the liquid crystal pixel or cell, however, it is possible to correct for the unwanted angular effects and thereby maintain higher contrast at both normal and larger viewing angles than otherwise possible.

The type and orientation of optical compensation or retardation required depends upon the type of display, normally black or normally white, which is used.

In a normally black (NB) twisted nematic display, the twisted nematic liquid crystal material is placed between polarizers whose transmission axes are parallel to one another. Such NB displays may be either front X-buffed or rear X-buffed. The first and second LC buffing zones are preferably perpendicular to one another thereby necessitating one of the buffs being perpendicular relative to the polarizer axes. If the first buff zone is perpendicular to the first polarizer transmission axis then the display is rear "X-buffed." Otherwise, it is front "X-buffed."

In the unenergized or OFF state (no voltage below the threshold voltage $V_{th}$ is applied across the liquid crystal material), normally incident light from the backlight is first polarized by the first polarizer and in passing through the pixel or cell has its polarization direction rotated by the twist angle of the liquid crystal material dictated by the buffing zones. This effect is known as the waveguiding or twisting effect. The twist angle is set, for example, to be about 90° so that the light is blocked or absorbed by the second or output polarizer. When a voltage is applied via electrodes across the normally black pixel, the liquid crystal molecules are forced to more nearly align with the electric field, eliminating the twisted nematic symmetry of the LC material. In this orientation, the optical molecular axes of the liquid crystal layer molecules are perpendicular to the cell walls. The liquid crystal layer then appears isotropic to normally incident light, eliminating the waveguiding effect such that the light polarization state is unchanged by propagation through the liquid crystal layer so that light can pass through the second or output polarizer. Patterns can be written in the NB display by selectively applying a variable voltage to the portions of the display which are to appear illuminated.

When viewed in the OFF state at both normal N and other viewing angles, however, the dark unenergized areas of a normally black display will appear colored because of angle dependent retardation effects for light passing through the liquid crystal layer at such angles. Contrast can be restored by using a compensating or retarding element which has an optical symmetry similar to that of the twisted liquid crystal layer but which reverses its effect. One method is to follow the active liquid crystal layer with another twist liquid crystal cell of reverse helicity. Another, in an NB cell, is to use one or more plate retarder compensators each having a constant birefringent value throughout the pixel. These compensation methods work because the compensation or retardation element shares an optical symmetry with the twisted nematic liquid crystal material in that both are preferably uniaxial birefringent materials having extraordinary axes orthongonal to the normal light propagation direction. These approaches to compensation have been widely utilized because of the ready availability of materials with the required optical symmetry. Reverse twist cells employ liquid crystals while retardation plates are readily manufactured by the stretching of the polymers such as polyvinyl alcohol (PVA). Regarding the reverse twist cell compensation technique discussed above, this requires the insertion of a second liquid crystal cell into the optical path, adding significant cost, weight and bulk to the display.

Despite the effectiveness of these compensation techniques, there are drawbacks to these approaches associated with the normally black operational mode. The appearance of a normally black display is very sensitive to cell gap "d." Consequently, in order to maintain a uniform dark appearance in the OFF state, it is necessary to match the thickness "d" of the liquid crystal layer to the first transmission minimum of each particular wavelength or color used in the pixel. This is illustrated in prior art FIG. 1 (see, for example, U.S. Pat. No. 4,632,514) which shows a multi-colored pixel for a liquid crystal display including a blue subpixel, a green subpixel and a red subpixel, wherein the thickness or cell gap "d" of the liquid crystal layer 15 varies according to the color or wavelength of each subpixel so as to match "d" to the first transmission minimum of each color. Such multi-gap displays are very difficult and expensive to manufacture.

Therefore, it would be highly desireable to provide a liquid crystal display including red, green, and blue subpixels as shown in FIG. 1, which has good color contrast ratios and compensates for the different color wavelengths but does not require varying the thickness "d" of the liquid crystal layer according to each color so as to selectively match "d" to the first transmission minimum of the wavelength of each subpixel color (red, green, blue).

Turning now to NW LCD cells, in a normally white liquid crystal display configuration, a twisted nematic cell preferably having a twist angle of about 90° is placed between polarizers which have crossed or perpendicular transmission axes, such that the transmission axis of each polarizer is parallel or perpendicular to the buffing direction of orientation of the liquid crystal molecules in the interface region of the liquid crystal material adjacent to each polarizer. In other words, NW cells can be either P-buffed wherein both polarizer axes are parallel to their respective adjacent buffing zones, or X-buffed wherein both polarizer axes are perpendicular to their respective buffing zones. This orientation of the polarizers reverses the sense of light and dark from that of the normally black display discussed above. The OFF or unenergized (no applied voltage above $V_{th}$ across the liquid crystal material) areas appear light in a normally white display, while those which are energized appeared dark. The problem of ostensibly dark areas appearing light or colored when viewed at large angles still occurs, however, the reason for it is different. Either positive or negative birefringent retarders may be used to correct the NW displays, depending upon their orientation. In the NW energized darkened areas, the liquid crystal molecules tend to align with the applied electric field. If this alignment were perfect, all of the liquid crystal molecules in the cell would have their long axes normal to the glass substrate or cell wall. In the energized state, the normally white display appears isotropic to normally incident light, which is blocked by the crossed polarizers, thus, resulting in a darkened pixel or subpixel.

The loss of contrast with increased viewing angles in NW pixels or displays occurs primarily because the homeotropic liquid crystal layer does not appear isotropic to off axis or off normal light. Light directed at off normal angles propagates in two modes due to the anisotropy or birefringence ($\Delta N$) of the liquid crystal layer, with a phase delay between these modes which increases with the incident angle of light. This phase dependence on the incident angle introduces an ellipticity to the polarization state which is then incompletely extinguished by the second polarizer, giving rise to light leakage. Because of the NW symmetry the birefringence has no azimuthal dependence.

Accordingly, what is often needed in normally white liquid crystal cells is an optical compensating or retarding element which would introduce a phase delay opposite in sign to that caused by the liquid crystal layer, thereby restoring the original polarization state, allowing the light to be blocked by the output polarizer. Optical compensating elements or retarders with such NW symmetry and often negative birefringence are known in the art and are disclosed, for example, in U.S. Pat. Nos. 5,196,953, 5,138,474, and 5,071,997, the disclosures of which are hereby incorporated herein by reference. It is known that the polyimides and co-polyimides disclosed by aforesaid U.S. Pat. No. 5,071,997 can be used as retarding elements in NW liquid crystal displays and are said to be custom tailorable to the desired negative birefringent values without the use of stretching.

Turning once again to FIG. 1, there is illustrated a prior art normally black liquid crystal display pixel including three colored subpixels. Optical radiation from a radiation source is applied to the liquid crystal display pixel of FIG. 1. The applied optical radiation schematically illustrated as 2A, 2B, and 2C, is typically from a single source, but is shown in FIG. 1 in terms of the component or subpixel units of the display pixel. The optical radiation first passes through first linear polarizer 14. The optical radiation is then applied to the liquid crystal cell 10. The liquid crystal cell 10 is bounded by two transparent glass substrates 11 and 12. On the interior surface of the glass substrate 12 are transparent conducting regions 18A, 18B, and 18C. These conducting regions are electrodes for applying an electric field to the liquid crystal layer 15 of each subpixel color component unit of the display pixel. The blue subpixel has a blue optical filter 16A; the green subpixel has a green optical filter 16B; and the red subpixel has a red optical filter 16C. These optical filters are coupled to the second glass substrate 11.

Deposited on the optical filters is a transparent conducting material 17 which acts as the second electrode for each subpixel of the liquid crystal pixel. A power supply 4 is provided to illustrate that a potential can be applied to the liquid crystal material 15 which occupies the region between the electrodes 18A, 18B, and 18C and the second electrode 17. As will be clear to those familiar with liquid crystal displays, the power supply 4 is typically replaced by addressing circuitry for applying a predetermined voltage to each of the subpixel electrodes. In this manner, an image can be displayed to a viewer (or observer).

The optical radiation 19A, having been linearly polarized by the first polarizer 14, is rotated about 90° during transmission through the liquid crystal material 15 between the first electrode 18A and second electrode 17. The linearly polarized optical radiation 19B and 19C are similarly rotated about 90° in the different color subpixels of the pixel. The optical radiation, after transmission through the liquid crystal material 15 passes through one of the color filters 16A, 16B, and 16C. The optical color filters select the color components for their respective subpixels to be transmitted by the color subpixels of the liquid crystal display. However, the different wavelengths (e.g. red, green, and blue) are affected to different extents by the birefringence of the LC material thereby necessitating the multi-gap configuration shown in FIG. 1 and creating different relative color leakages at different viewing angles.

After transmission through the liquid crystal material, the optical radiation is transmitted through the retardation plates 21 and 22. The off axis transmission, as discussed above, becomes increasingly elliptically polarized with increased angle, a result of the birefringence of the liquid crystal material. The result of this elliptical polarization is a reduction of radiation contrast as a function of angle about the normal axis N after transmission of the radiation through the second linear polarizing plate 13. In order to compensate for the angular dependent reduction in contrast, retardation plates 21 and 22 of constant retardation value are interposed between the substrate 11 and the polarizer 13 as shown in FIG. 1. The presence of the retardation plates 21 and 22 results in a decrease in the elliptical polarization of the radiation applied to the linear polarizing plate 13. Consequently, the angle dependent variation in contrast ratio of the radiation transmitted through the second linear polarizing plate 13 is improved.

Furthermore, as shown in FIG. 1, the multi-gap aspect of this prior art pixel requires the thickness "d" of each subpixel being selected so as to match the optical path difference (d·ΔN)÷λ of the liquid crystal cell 15 to the first transmission minimum of each respective color of the three subpixels. Accordingly, because each color (red, green, and blue) has a different wavelength and the birefringent value ΔN of the liquid crystal material remains constant, the thickness "d" of each subpixel must be adjusted accordingly so as to compensate for the different wavelengths of each color and the cell is thereby optimized for the normal viewing angle N. The normal viewing angle herein is shown by reference element "N" and means about a 0° horizontal and vertical viewing angle.

Reference next is to prior art FIG. 2, which illustrates schematically how the light travels in the LCD of FIG. 1. As illustrated, the incoming radiation 2 is first transmitted through first linear polarizer 14. The next optically oriented region through which the optical radiation passes is the first orientation film or surface 18S of the conducting plates with which the liquid crystal material 15 is in contact. The surface 18S has an orientation or buffing parallel to the first linear polarizer 14. Ignoring for purposes of this discussion the controllable orientation of the actual liquid crystal material, the next optically oriented region through which the optical radiation is transmitted is the second orientation film or buffed surface 17S of the second conducting electrode 17, the second surface to which the liquid crystal material 15 is exposed. The surface 17S is oriented or buffed in a direction perpendicular to the surface 18S to which the liquid crystal is exposed thereby creating about a 90° twist in the LC material. The retardation plate 21, having a constant anisotropic or birefringent value (ΔN) as well as a constant retardation value throughout all three subpixels, has an optical axis oriented parallel to the orientation of the surface 17S, while retardation plate 22, also having a constant birefringent value throughout all three subpixels, has its optical axis oriented at right angles to the axis orientation of retardation plate 21. The retardation value of a retardation plate or film is determined by the formula "d·ΔN," wherein "d" is the thickness of the plate or film and "ΔN" is the birefringent value of the plate. Finally, when the pixel is in the ON or energized state, the optical radiation is transmitted through the second linear polarizer 13 which is oriented parallel to retardation plate 22 and linear polarizer 14.

Referring next to FIG. 3, which is a graph illustrating the different transmission minimums of red, green, and blue wavelengths in a normally black liquid crystal cell, the percent optical transmission through a liquid crystal cell in the absence of an applied electric field as a function of distance "d" in the liquid crystal material through which the optical radiation travels is illustrated for the typical color components. For substantially no transmission of optical radiation in the OFF state, the transmission minimum for blue radiation occurs at approximately a thickness of the liquid crystal material "d (blue)", the transmission minimum for green radiation occurs at a thickness of liquid crystal material of "d (green)" which is greater than "d (blue)", and the transmission minimum for red radiation occurs at a thickness of liquid crystal material of "d (red)" which is greater than "d (green)". This difference in the minimum of the transmitted radiation of each color is, as discussed above, the reason that the cell thickness "d" of each subpixel is different in the multi-gap configuration of FIG. 1.

A drawback of the prior art liquid crystal display discussed above such as has been illustrated and discussed with reference to FIGS. 1–2, is that the thicknesses "d" of the LC material must be finely adjusted to match the first transmission minimum of each color, and furthermore, the retardation film(s) 21 and 22 have a single retardation value applicable to all of the colored subpixels and do not take into consideration the different wavelengths. Because of the constant retardation values of the retardation films for all of the subpixels, the result is that at different viewing angles, there are different viewing leakages for the different colors (red, green, and blue). The NB pixel shown in FIG. 1, for example, when viewed in the OFF state at a normal viewing angle N experiences a blue leakage, because the single constant value of the retardation plates or films is substantially matched to the green wavelength at a normal viewing angle. However, at increased horizontal viewing angles, the pixel of FIG. 1 experiences green and red leakage while properly transmitting the blue color.

In the case of obliquely angled light traveling through the pixel shown in FIG. 1, the normal component or vector is twisted about 90° by the liquid crystal material but the horizontal component is twisted to another angle dependent value. The purpose of the retardation plates 21 and 22 shown in FIG. 1 is to correct the horizontal component which was adversely affected by the liquid crystal material. However, the retarders shown in FIG. 1 have a single retardation value which does not take into consideration the different wavelengths of each color (e.g. red, green, and blue) which have been affected differently by the birefringence of the LC material. In other words, when using a retarder with a constant retardation value, the overall viewing angle of the multi-gap pixel shown in FIG. 1 can be improved, but at different viewing angles, the result is different viewing leakages for each color.

Prior art FIG. 4 illustrates a second type of known NB pixel which includes red, green, and blue subpixels. Normally incident light 101 first passes through a first linear polarizer 103. First linear polarizer 103 has a transmission axis parallel to the transmission axis of second linear polarizer 112, thereby defining a normally black (NB) liquid crystal display pixel. After being polarized by linear polarizer 103, the light 101 then proceeds through a first transparent substrate 104 and transparent subpixel electrodes 105. Each color subpixel has its own electrode 105 which enables a selectively activated voltage to be applied across each subpixel. After passing through electrodes 105, the normally incident light 101 then proceeds into and through a liquid crystal layer 109 having a thickness "d." The liquid crystal layer 109, having a constant thickness throughout the entire pixel, has, at its interface with electrodes 105 a first orientation film (not shown) buffed in a direction substantially perpendicular to the transmission axis of the first polarizer 103. Opposing the first orientation film (not shown) is a second orientation film (not shown) disposed at the interface of the liquid crystal material 109 and color filters 106–108. This second orientation film (not shown) is buffed in a direction substantially parallel to the transmission axes of both the first and second polarizers. The substantially crossed buffing directions of the first and second orientation films (not shown) creates about a 82°–100° twist in the liquid crystal layer 109. In other words, as normally incident light passes through the liquid crystal material 109 from the first orientation film adjacent the electrodes 105 to the second orientation film adjacent the color filters, the light is twisted about 82°–100°. After proceeding through the liquid crystal layer 109, the light then progresses through the aforesaid described second orientation film and the color filters 106–108 of the respective subpixels. The blue subpixel includes a blue color filter 106, the red subpixel a red color filter 107, and the green subpixel a green color filter 108. After passing through one of the color filters, the normally incident light then proceeds through a second transparent substrate 110, a retardation film 111, and a second or exit polarizer 112. The retardation film 111 has a constant retardation value throughout the entire pixel. After passing through the second polarizer 112 which has a transmission axis oriented parallel to the transmission axis of the first polarizer 103, the light proceeds toward a viewer who preferably views the resulting light at an ON axis or normal viewing angle 113. The normal viewing angle N has its axis perpendicular to a plane defined by, for example, the polarizers 103 and 112 of the liquid crystal cell.

The cell gap or thickness "d" of this particular pixel is about 5.70 micrometers and is matched to the first transmission minimum for the color green which has a wavelength of 550 nm. The retardation film 111 has a constant birefringent value ($\Delta N$) which is positive. The optical axis of the retardation film 111 is parallel to the buffing zone of the first orientation film and perpendicular to the transmission axes of the first and second polarizers 103 and 112. The principal drawback, as will be described below, of this prior art pixel shown in FIG. 4 is that the different wavelengths representative of the different colors are not compensated for, the result being a variance in contrast between the colors at different viewing angles.

FIGS. 5–7 are computer simulation graphs illustrating the effect of the pixel of FIG. 4, absent its retardation film, upon red, green, and blue wavelengths respectively.

FIG. 5 is a computer simulation graph illustrating the effect of the pixel of FIG. 4, absent its retardation film 111, on the red light wavelength of 630 nm. The parameters used in simulating this effect shown in FIG. 5, include a cell gap "d" of 5.70 micrometers, a driving ON voltage of 4.0 volts, an OFF voltage of 0.9 volts, and the linear polarizers 103 and 112 having transmission axes parallel to one another and perpendicular to the first buffing zone adjacent the electrodes 105. As can be seen in FIG. 5, the contrast ratio at normal (0° vertical, 0° horizontal viewing angle) is only about 30:1. Furthermore, as one proceeds up and down the 0° horizontal axis (e.g. 0° horizontal, –40° to 40° vertical), the contrast ratio never exceeds about 30:1 and quickly drops below 30:1 at vertical viewing angles of about 7° and –15°. This graph illustrates a twin peak effect meaning that while the contrast ratio is poor at normal, it is improved horizontally on both sides of normal. In other words, the contrast ratio at 0° vertical and 30° horizontal is about 130; and the contrast ratio at 0° vertical and –30° horizontal is about 110:1. As is evident by this graph illustrated in FIG. 5, the red wavelength of 630 nm incident upon the pixel of FIG. 4 absent its retarder, suffers greatly at substantially normal viewing angles, and all vertical viewing angles where the horizontal viewing angle is around 0°.

FIG. 6 is a computer simulation of the effect that the pixel of FIG. 4, absent its retardation film, has upon green light with a wavelength of 550 nm. This simulation utilizes as parameters a cell gap of 5.70 micrometers, an ON voltage of 4.0 volts, an OFF voltage of 0.9 volts, and parallel polarizer axes which are perpendicular to the first buffing zone adjacent the electrodes 105. Because the cell gap "d" of the FIG. 4 prior art pixel is matched to the first transmission minimum of the green wavelength of 550 nm used in this simulation, the contrast ratio at normal (0° vertical, 0° horizontal) is very good at about 210:1. The 30:1 contrast ratio curve extends along the 0° horizontal axis from vertical angles of about –27° to about +30° thereby spanning a range along the 0° horizontal axis of about 57°. Furthermore, the 30:1 contrast ratio curve extends along the 0° vertical axis from horizontal angles of about –37° to about +37°, thereby defining a horizontal range along the 0° vertical viewing axis of about 74°. The contrast ratio curves of FIG. 6 for the color green are markedly superior to those of FIG. 5 because the cell gap "d" of the FIG. 4 pixel is matched to the first transmission minimum for the color green, while being lower than the first transmission minimum of the color red. Likewise, because the cell gap of the FIG. 4 pixel is matched to the first transmission minimum of the color green and is higher than that needed for the color blue, the contrast ratio graph for the color blue described below with regard to FIG. 7 is inferior to that of the color green shown in FIG. 6.

FIG. 7 is a computer simulation of a graph illustrating the effect of the pixel shown in FIG. 4, absent its retardation film, on the blue wavelength at 480 nm. This graph uses parameters including a cell gap of 5.70 micrometers, an ON voltage of 4.0 volts, an OFF voltage of 0.9 volts, and polarizers having parallel transmission axes perpendicular to the first buffing zone. As can be seen in FIG. 7, because the cell gap "d" of the FIG. 4 pixel is not matched to the first transmission minimum for the color blue, the contrast ratio of the blue wavelength at normal is poor, being less than about 40:1. Furthermore, the 30:1 contrast ratio curve extends along the 0° horizontal axis only to a limitation of about −8° vertical. Also, the same 30:1 contrast ratio curve extends along the vertical 0° axis to horizontal extents of only about −13° and +13°. As will be evident to those skilled in the liquid crystal display art, this is a relatively poor contrast ratio curve indicative of the problems of the prior art FIG. 4 pixel.

FIGS. 8–10 are computer simulation graphs illustrating the contrast ratio curves of the prior art FIG. 4 pixel, including a retardation film having a constant retardation value of 275 nm, with respect to the colors red, green, and blue respectively. These three graphs utilize voltage parameters including a 4.8 V on voltage, and a 0.2 V OFF voltage. The use of a 275 nm retardation film within the FIG. 4 prior art pixel is not considered prior art, but is utilized in these simulation graphs for the purpose of later discussed comparison with certain embodiments of this invention.

FIG. 8 illustrates the contrast ratios given the color red at a wavelength of 630 nm by the prior art pixel shown in FIG. 4 including a 275 nm retardation film. The contrast ratio at normal is only about 30:1. The 30:1 contrast ratio curve extends along the 0° horizontal viewing axis to vertical viewing angles of about −35° and +12°. Again, the contrast ratio curves shown in FIG. 8 for the color red are very poor because the pixel of FIG. 4 including its retardation film having a constant retardation value of 275 nm, does not compensate for the different wavelengths representative of the red, green, and blue colors. Accordingly, because the cell gap of the FIG. 4 pixel is matched to the first transmission minimum of the color green, thereby being below the first transmission minimum for the color red, the resulting contrast ratios for the color red at normal and most other viewing angles are very poor as illustrated in FIG. 8.

FIG. 9 is a computer simulation of contrast ratios for the color green wavelength of 550 nm resulting from the pixel shown in FIG. 4 including a retardation film having a retardation value of 275 nm. Because the cell gap of 5.70 micrometers is matched to the first transmission minimum for the color green, the resultant contrast ratio curves illustrated by FIG. 9 are relatively good. The contrast ratio at normal is about 270:1, while the 30:1 contrast ratio curve extends off the graph along both the vertical and horizontal 0° viewing axes. As discussed previously, the reason for the superior contrast ratios for the color green in the FIG. 4 pixel, is that the cell gap in the pixel is matched to the first transmission minimum for the color green, and furthermore, the retardation film has a retardation value of 275 nm which is also personalized to the color green.

FIG. 10 illustrates a computer simulation graph of contrast ratios for the color blue wavelength of 480 nm propagating through the prior art pixel shown in FIG. 4. As can be seen in FIG. 10, because the cell gap "d" is not matched to the first transmission minimum of the blue wavelength, the contrast ratios are poor. At normal, for example, the contrast ratio is only about 30:1. The 30:1 contrast ratio curve extends horizontally along the 0° vertical viewing axis from about −26° to +26°. Furthermore, the 30:1 contrast ratio curve extends downward along the 0° horizontal axis only to about −9° vertical. Accordingly, it is clear that the prior art pixel shown in FIG. 4 provides poor contrast ratios both horizontally and vertically for the blue wavelength.

It would clearly be a step forward in the art if a liquid crystal display pixel could be provided which displayed good contrast ratios for all colors and eliminated the need for the multi-gap configuration shown in FIG. 1.

U.S. Pat. No. 5,179,457 discloses a liquid crystal display device including a phase plate disposed between a liquid crystal layer and a lower electrode, wherein the phase plate has different amounts of birefringence at different positions thereby creating a color display without using color filter(s). U.S. Pat. No. 5,179,457 does not discuss using such a phase plate in combination with color filters, and is directed toward a different type of LCD than the present Invention.

U.S. Pat. No. 5,150,237 discloses an electrically controlled birefringence (ECB) type LCD which utilizes a uniaxial medium having a positive anisotropy arranged between the liquid crystal layer and a polarizer, wherein the products of refractive index anisotropy and thickness of the uniaxial medium are different from each other in accordance with the difference between displayed colors. The ECB display of U.S. Pat. No. 5,150,237 is not directed toward a twisted nematic type LCD which uses color filters as described by the instant invention.

U.S. Pat. No. 5,250,214 discloses a combination of a phase plate and an optical color filter film wherein the phase plate includes a film of liquid crystal polymer composition having polyester as a main constituent.

U.S. Pat. No. 5,229,039 discloses a polyimide based color filter which also functions as an orientation film.

The aforesaid discussed prior art which utilizes both retarders and color filters all utilize one element which functions as a color filter and another separate element which functions as a retarder. It would solve a long-felt need in the art if these two functions could be performed by a single element which functioned as both a color filter and a retardation element.

The term "interior" when used herein to describe a surface or side of an element, means the side or surface closest to the liquid crystal material.

The term "retardation value" as used herein means "d·ΔN" of the retardation film or plate, wherein "d" is the film thickness and "ΔN" is the film birefringence. Defined values may be either positive or negative depending on the birefringence of the film.

The terms "clockwise" and "counterclockwise" mean as viewed from the observer's side of the liquid crystal display.

The term "first" when used herein but only as it is used to describe substrates, polarizers, electrodes, buffing zones, and orientation films means that the described element is on the incident light side of the liquid crystal material, or in other words, on the side of the liquid crystal material opposite the viewer.

The term "second" when used herein but only as it is used to describe substrates, polarizers, electrodes, buffing zones, and orientation films means that the described element is located on the viewer side of the liquid crystal material layer.

The "horizontal viewing angles" (or $X_{ANG}$) and "vertical viewing angles" (or $Y_{ANG}$) illustrated and described herein (see FIG. 24) may be transformed to conventional LCD angles $\phi$ and $\Theta$ by the following equations:

$$TAN(X_{ANG}) = COS(\phi) \cdot TAN(\Theta)$$

$$SIN(Y_{ANG}) = SIN(\Theta) \cdot SIN(\phi)$$

$$COS(\Theta) = COS(Y_{ANG}) \cdot COS(X_{ANG})$$

$$TAN(\phi) = TAN(Y_{ANG}) \div SIN(X_{ANG})$$

FIG. 24 illustrates the relationship between the four different angles.

It is apparent from the above that there exists a need in the art for a multi-colored liquid crystal display pixel wherein the multi-gap need to adjust the cell gap "d" for each color is eliminated and each color wavelength is compensated for, thereby improving the viewing angle and contrast ratios associated therewith for each particular color and substantially eliminating different viewing leakages for different colors at various viewing angles. There also exists a need in the art for a single element which functions as both an optical retarder and a color filter.

SUMMARY OF THE INVENTION

Generally speaking, this invention fulfills the above-described needs in the art by providing a twisted nematic pixel for use in a liquid crystal display, the pixel comprising: a first subpixel having a first color filter and a first retardation film; a second subpixel having a second color filter and a second retardation film; and wherein the first and second retardation films have retardation values different from one another and the first and second color filters are different from one another.

In certain preferred embodiments of this invention, the first and second retardation films and their respective retardation values are selected according to the color of each subpixel and the pixel further includes a third subpixel having a third color filter and a third retardation film having a retardation value different than the retardation values of the first and second retardation films.

In still further preferred embodiments of this invention, the first and second retardation films are directly deposited onto the first and second color filters respectively and the color filters are located on a substrate and wherein the substrate is located between the color filters and a polarizer. In certain other preferred embodiments of this invention, the pixel further comprises a retardation layer between the substrate and the polarizer, wherein the retardation layer has a substantially constant retardation value.

In additional preferred embodiments of this invention, the pixel further comprises a liquid crystal layer having a thickness less than about 10 $\mu$m.

In still further preferred embodiments of this invention, the first and second retardation films are made of the same material and have substantially different thicknesses and wherein the first and second retardation films are spin-coated onto the first and second color filters respectively.

In certain other preferred embodiments of this invention, the first color filter and the first retardation film are combined into a single integrally formed polymer based element which functions as both a color filter and a retarder, and wherein the single integrally formed polymer based element is formed by dissolving or immersing a color filter dye into a soluble polymer, thus creating a single integrally formed element which functions as both a color filter and a retarder.

In certain further preferred embodiments of this invention, the first and second retardation films have optical axes which are substantially parallel to one another.

In still further preferred embodiments of this invention the first and second retardation films have optical axes which are not substantially parallel to one another and are selected in accordance with the color wavelength of each subpixel. In certain further preferred embodiments of this invention, the first color filter is a red color filter, the second color filter is a green color filter and the retardation value of the first retardation film is about 250–350 nm and the retardation value of the second retardation film is about 225–325 nm. In certain other preferred embodiments of this invention, the retardation value of the first retardation film is about 300–325 nm and the retardation value of the second retardation film is about 265–285 nm, and wherein the pixel further comprises a liquid crystal layer having a thickness substantially matched to the first transmission minimum of the color wavelength of the second subpixel.

This invention further fulfills the above described needs in the art by providing a pixel for use in a liquid crystal display, comprising: a first subpixel having a first retardation means including a first optical axis; a second subpixel having a second retardation means including a second optical axis; and wherein the first optical axis and the second optical axis are oriented in different directions.

In certain preferred embodiments of this invention, the first and second retardation means include a retardation film.

In certain further preferred embodiments of this invention, the first and second retardation means are at least substantially partially co-planar, and wherein the different directions are selected in accordance with the color of each subpixel.

In certain further preferred embodiments of this invention, the pixel further comprises first and second transparent substrates and a third subpixel, and wherein said first and second retardation means are disposed between said first and second substrates. In certain other preferred embodiments of this invention, the first optical axis of the first retardation means is oriented in a direction at least about 2° different than the orientation of the second optical axis of the second retardation means.

In still further preferred embodiments of this invention, the direction of the second optical axis is substantially parallel to the buffing direction of a first orientation means disposed on a first side of a liquid crystal layer, wherein light is adapted to first enter the liquid crystal layer at the interface between the liquid crystal material and the first orientation means.

This invention further fulfills the above-described needs in the art by providing a multi-colored pixel for use in a liquid crystal display, comprising: a first polarizer on a first substrate; a second polarizer on a viewer side of the pixel, and on a second substrate; a liquid crystal layer disposed between the first and second polarizers; first and second subpixels each having a different color optical filter therein for transmitting a different predetermined color or wavelength of optical radiation; and wherein the first subpixel includes a first retardation means having a first predetermined retardation value, and the second subpixel includes a second retardation means having a second predetermined retardation value different than the first predetermined retardation value, and wherein the first and second retardation means are disposed between the first and second substrates.

In certain further preferred embodiments of this invention, the first and second retardation values are selected according to the different colors of the first and second subpixels and the first subpixel has a red color filter and the second subpixel has a green color filter. In still further preferred embodiments of this invention, wherein the liquid crystal layer is of the twisted nematic type and is disposed between the first and second substrates, and wherein the color filters are located on the second substrate with the liquid crystal layer disposed between the color filters and the first substrate.

In certain other preferred embodiments of this invention, the pixel further comprises a transparent electrode film located on the first and second retardation means whereby the color filters and the retardation means are disposed between the electrode and the second substrate, and an orientation film laminated onto the transparent electrode whereby the liquid crystal layer is disposed between the orientation film and the first substrate.

In certain further preferred embodiments of this invention, the first retardation means includes an optical compensating or retardation film having a first thickness and the second retardation means includes an optical compensating or retardation film having a second thickness different than the first thickness wherein the second retardation means has a retardation value larger than the first retardation means.

In still other preferred embodiments of this invention, the retardation values of the retardation means are negative and the first and second polarizers are crossed thereby creating a normally white pixel. In certain further preferred embodiments of this invention, the retardation values of the retardation films are positive and the first and second polarizers are parallel thereby creating a normally black pixel.

In certain further preferred embodiments of this invention, the liquid crystal material has about a 90° twist in the OFF state. In certain further preferred embodiments of this invention, the first and second retardation means includes only one optical compensating or retardation film and wherein the optical compensation film has an upper terraced surface defining different thicknesses of the film. In certain other preferred embodiments of this invention, the pixel further comprises a third retardation means laminated between the second substrate and the second polarizer.

In certain preferred embodiments of this invention, the pixel is a normally black pixel. In other certain preferred embodiments of this invention, the pixel is a normally white pixel.

In certain further preferred embodiments of this invention, the first and second retardation films have positive birefringent values. In still further preferred embodiments of this invention, the first and second retardation films have negative birefringent values.

This invention further fulfills the above-described needs in the art by providing a liquid crystal display including a plurality of pixels, the pixels comprising: first and second polarizers with a liquid crystal layer disposed therebetween with orientation means disposed immediately adjacent both sides of the liquid crystal layer; means for applying a voltage across the liquid crystal layer; and a single polyimide based element which functions as both a color filter and an optical retarder.

In certain preferred embodiments, the polyimide based element includes a color dye immersed or dissolved therein, and the polyimide is an organic solvent soluble polyimide or co-polyimide.

In certain further preferred embodiments of this invention, the polyimide is an organic solvent soluble homopolyimide.

In certain preferred embodiments of this invention, the homopolyimide is selected from the groups consisting of: (i) a pyromellitic dianhydride (PMDA) and 2, 2'-bis (trifluoromethyl) benzidine (BTMB); (ii) 3, 3', 4, 4'-benzophenone tetracarboxylic dianhydride (BTDA) and 2, 2' bis (trifluoromethyy) benzidine (BTMB); (iii) 4, 4'-oxydiphthalic anhydride (ODPA) and 2, 2' bis (trifluoromethyl) benzidine (BTMB); (iv) 3, 3', 4, 4'-diphenylsu tetracarboxylic dianhydride (DSDA) and 2, 2' bis (trifluoromethyl) benzidine (BTMB); (v) 3, 3', 4, 4'-biphenyl tetracarboxylic dianhydride (BPDA) and 2, 2' bis (trifluoromethyl) benzidine (BTMB); and (vi) 2, 2'-bis (dicarbonylphenyl) hexafluoropropane dianhydride (6FDA) and 2, 2' bis (tri-fluoromethyl) benzidine (BTMB).

This invention further fulfills the above-described needs in the art by providing a method of making a liquid crystal display pixel including a polyimide based element which functions in the liquid crystal display pixel as both a color filter and a retarder, comprising the steps of: a) selecting an organic solvent soluble polyimide selected from the group consisting of: (i) a homopolyimide; and (ii) a co-polyimide; b) immersing a color dye therein; and c) positioning said resulting polyimide based element in a pixel of a liquid crystal display thereby allowing the polyimide based element to function as both a color filter and a retarder in the pixel.

This invention will now be described with respect to certain embodiments thereof, accompanied by certain illustrations, wherein:

IN THE DRAWINGS

Figure 1:
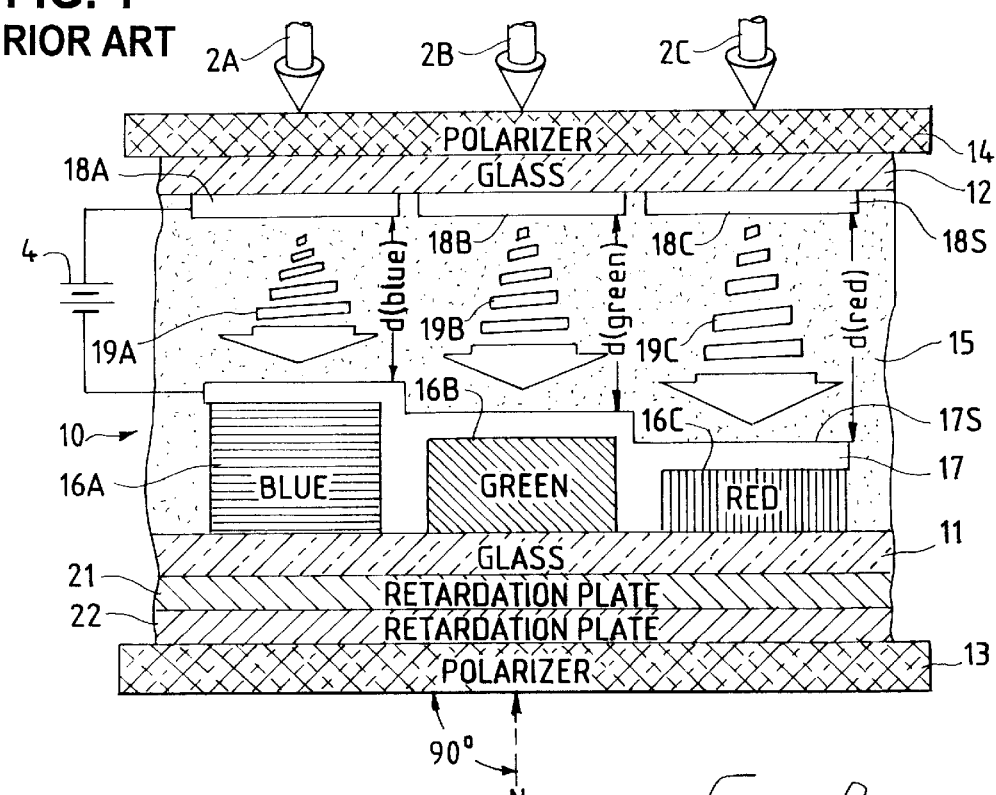
FIG. 1 is a prior art cross sectional view of a conventional normally black liquid crystal display pixel of the multi-gap type including two retardation plates each having a constant birefringent and retardation value throughout the entire pixel and wherein the cell gap "d" of the LC material for each subpixel is matched to the first transmission minimum of the color wavelength of that subpixel.
Figure 2:
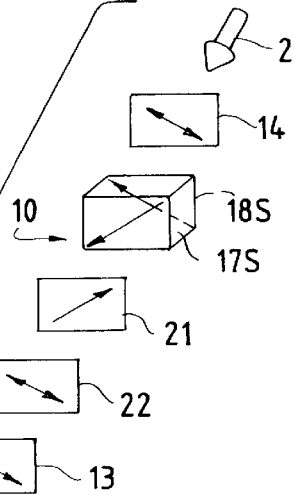
FIG. 2 is a schematic diagram illustrating the optical orientations of the prior art components of the twisted nematic NB liquid crystal display pixel of FIG. 1.
Figure 3:
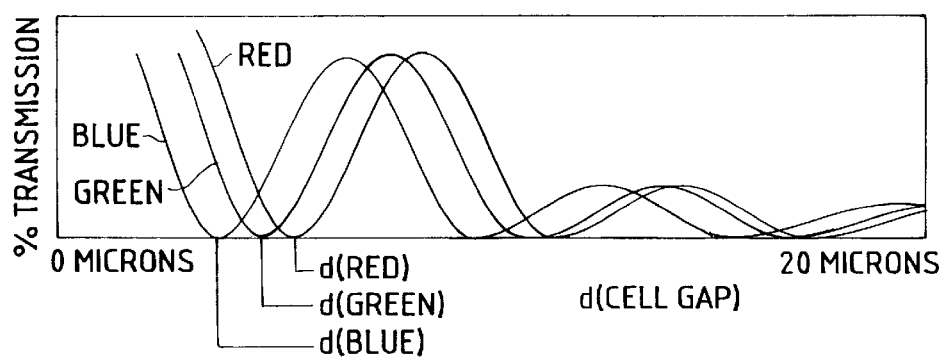

FIG. 3 displays the percent transmission of red, green, and blue light through a liquid crystal pixel as a function of cell thickness "d" for the three wavelengths of red, green, and blue. This graph illustrates the rationale behind the multi-gap configuration of the pixel shown in FIG. 1.

Figure 4:
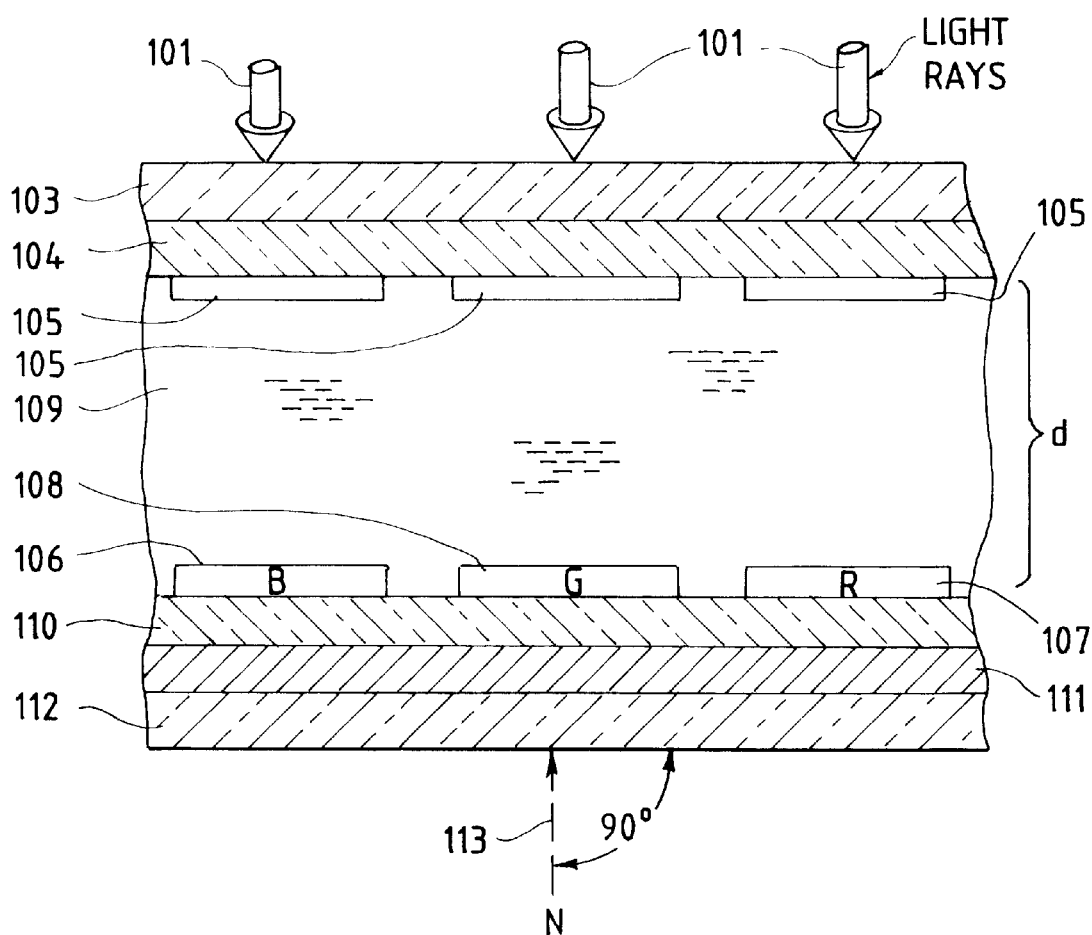

FIG. 4 is a prior art cross sectional view of a normally black liquid crystal display pixel including red, green, and blue subpixels. This pixel includes a single retardation film having a constant birefringent and retardation value throughout the entire pixel wherein the cell gap "d" of the pixel is constant for all three subpixels.

Figure 5:
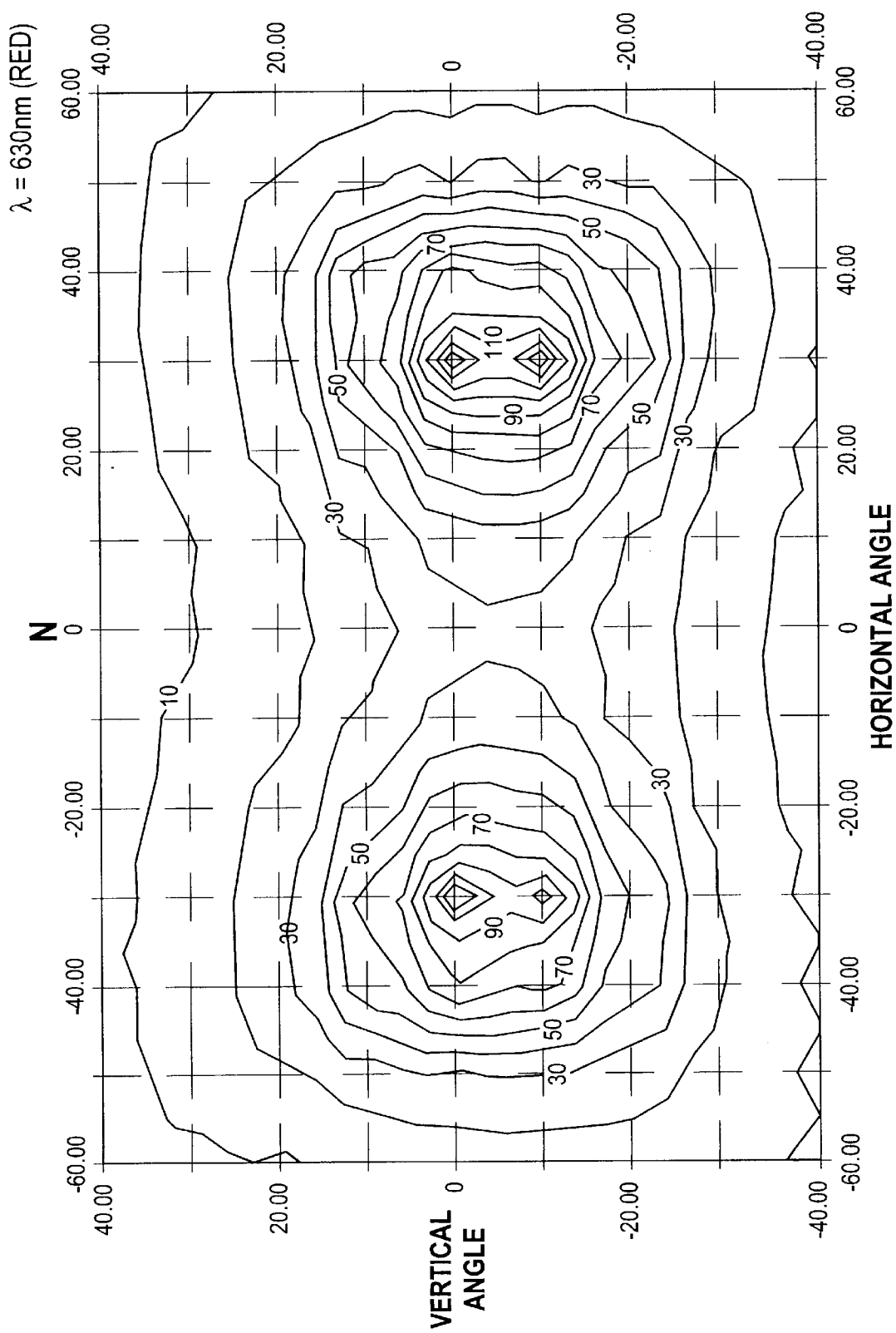

FIG. 5 is a computer simulation graph illustrating the contrast ratios for the color red resulting from the prior art pixel shown in FIG. 4, absent the retardation film.

Figure 6:
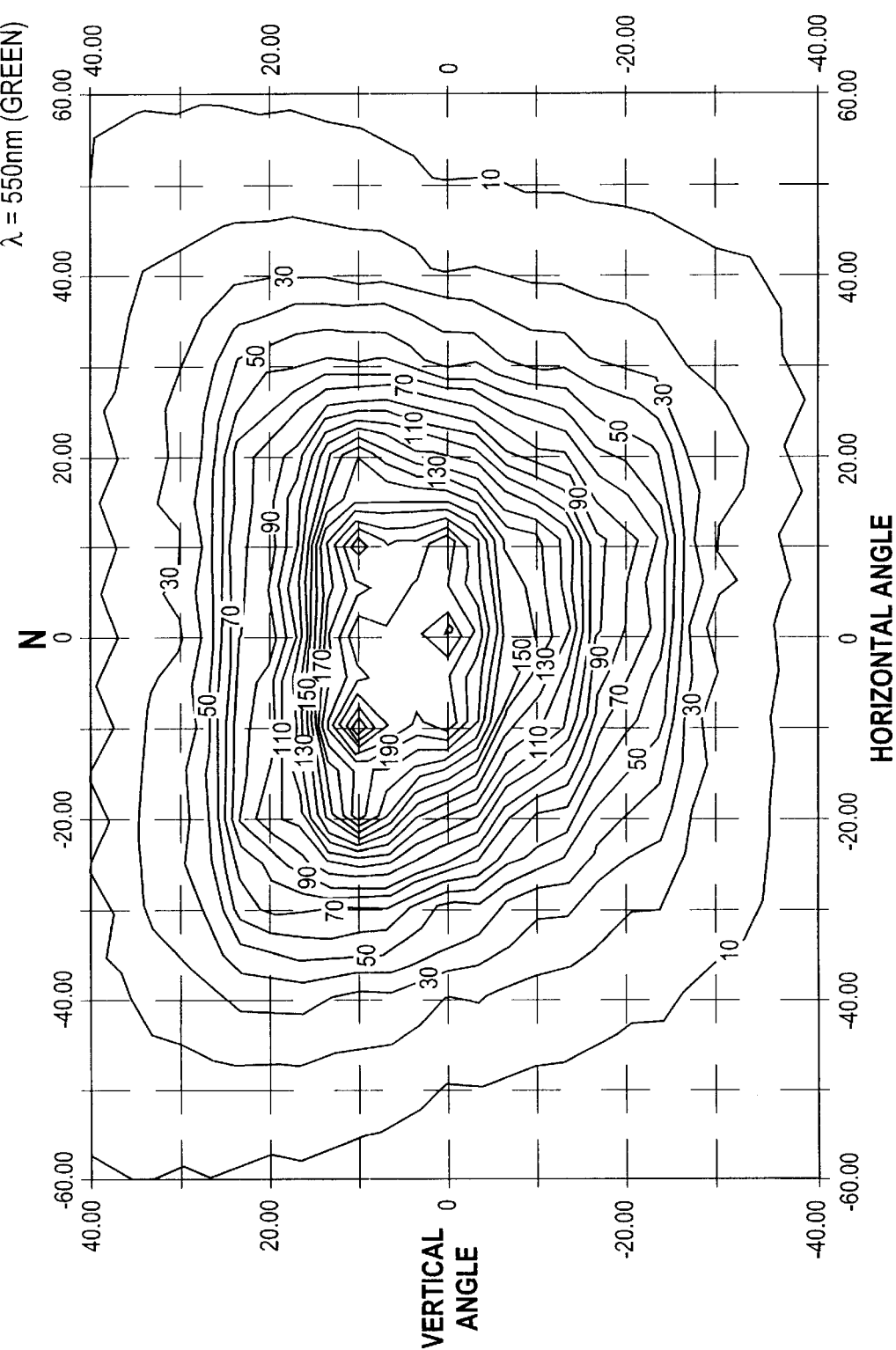

FIG. 6 is a computer simulation graph of the contrast ratios of the color green resulting from the prior art pixel shown in FIG. 4, absent the retardation film.

Figure 7:
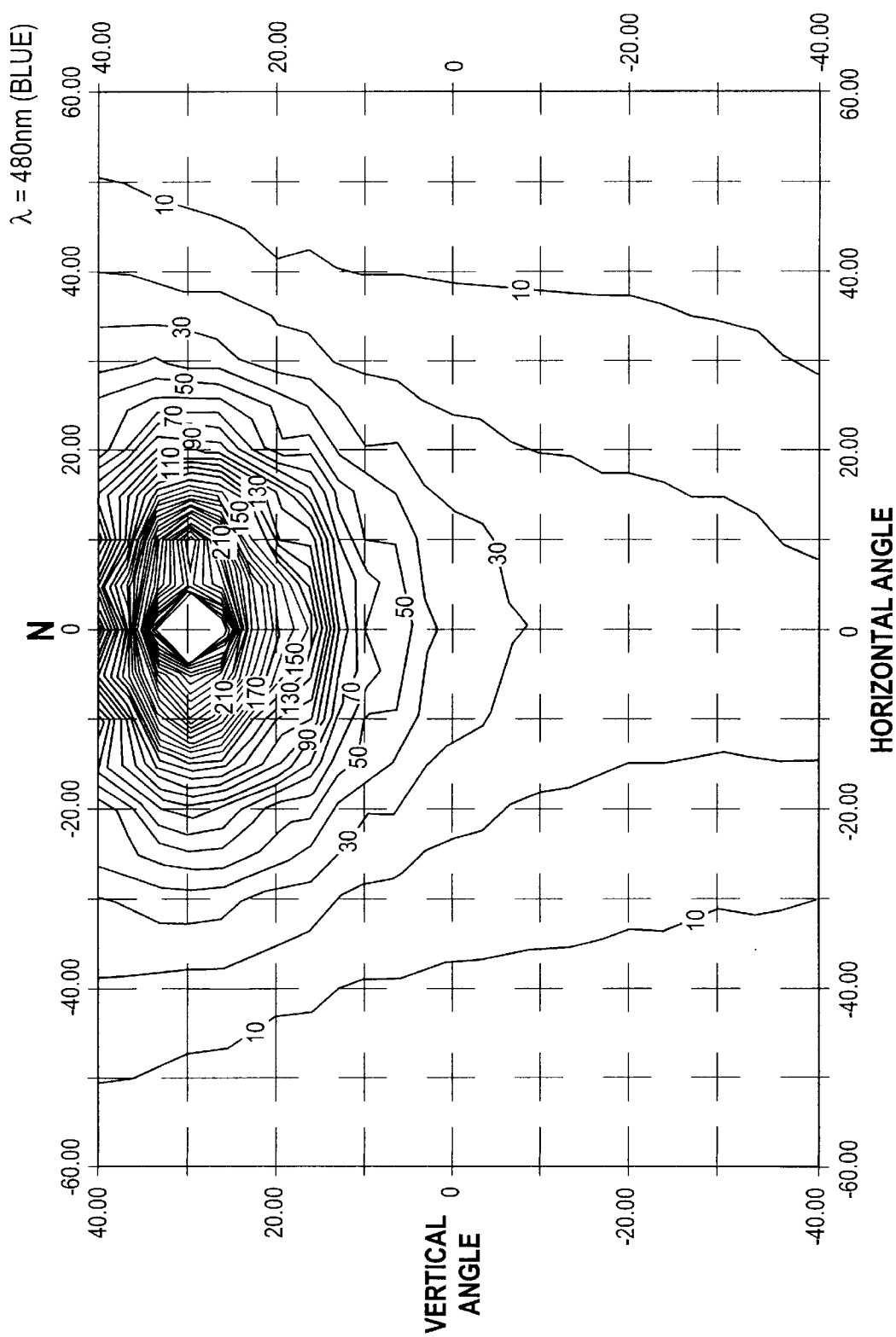

FIG. 7 is a computer simulation graph illustrating the contrast ratio curves of the color blue resulting from the prior art pixel shown in FIG. 4, absent the retardation film.

Figure 8:
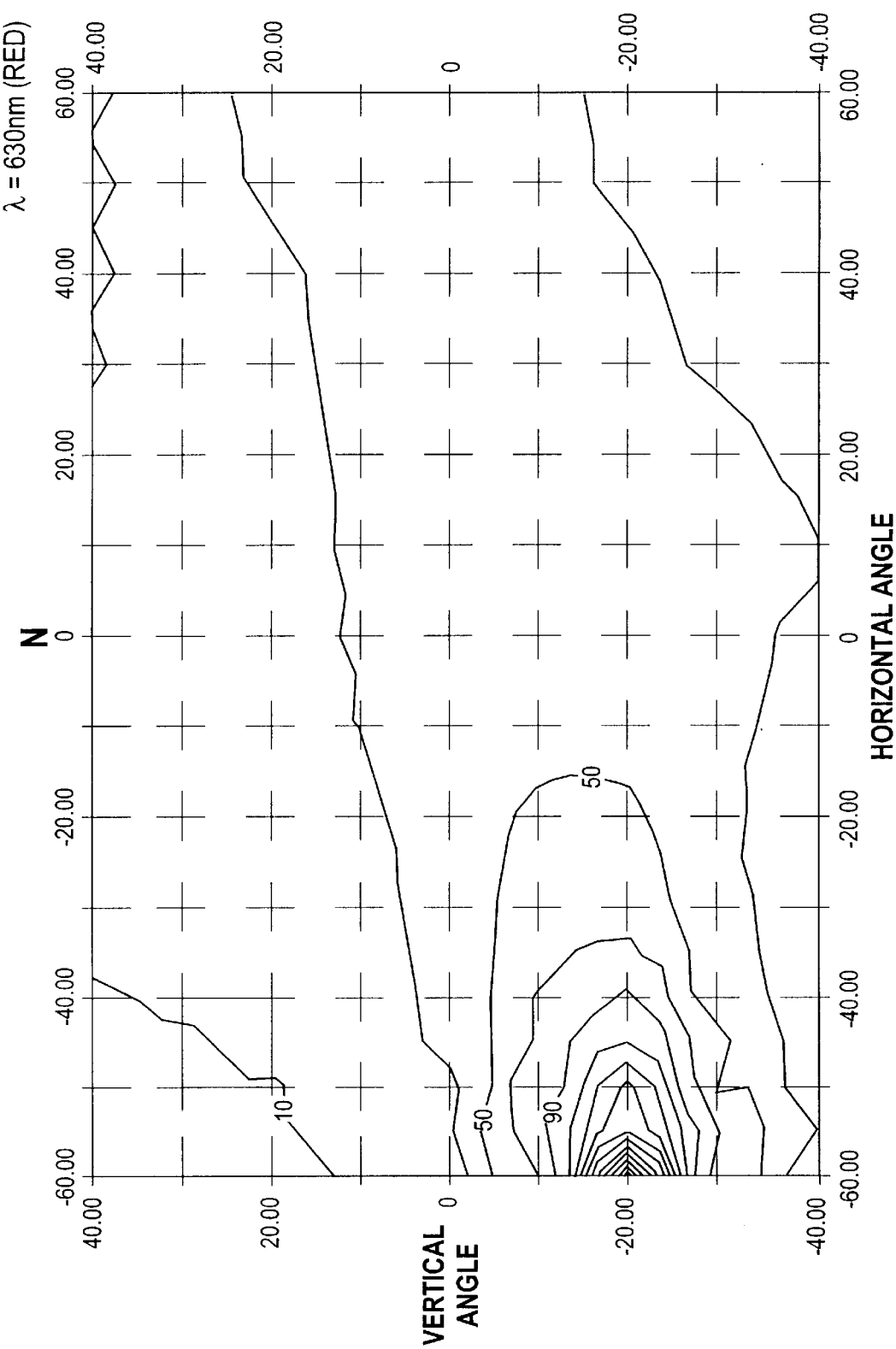

FIG. 8 is a computer simulation graph illustrating the contrast ratio curves of the color red resulting from the prior art pixel shown in FIG. 4, and wherein the retardation film has a retardation value of 275 nm.

Figure 9:
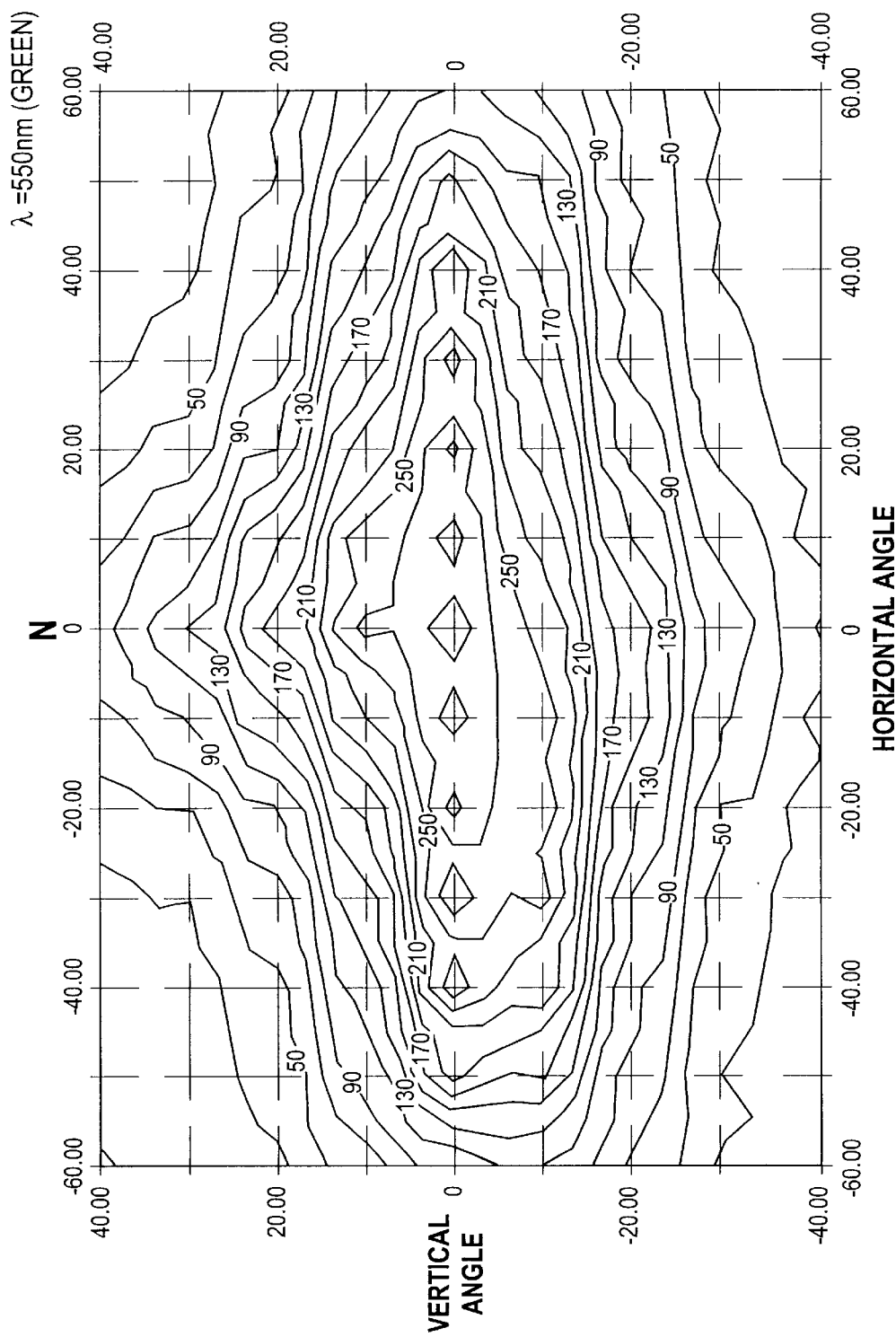

FIG. 9 is a computer simulation graph illustrating the contrast ratio curves of the color green resulting from the prior art pixel shown in FIG. 4, wherein the retardation film has a retardation value of 275 nm.

Figure 10:
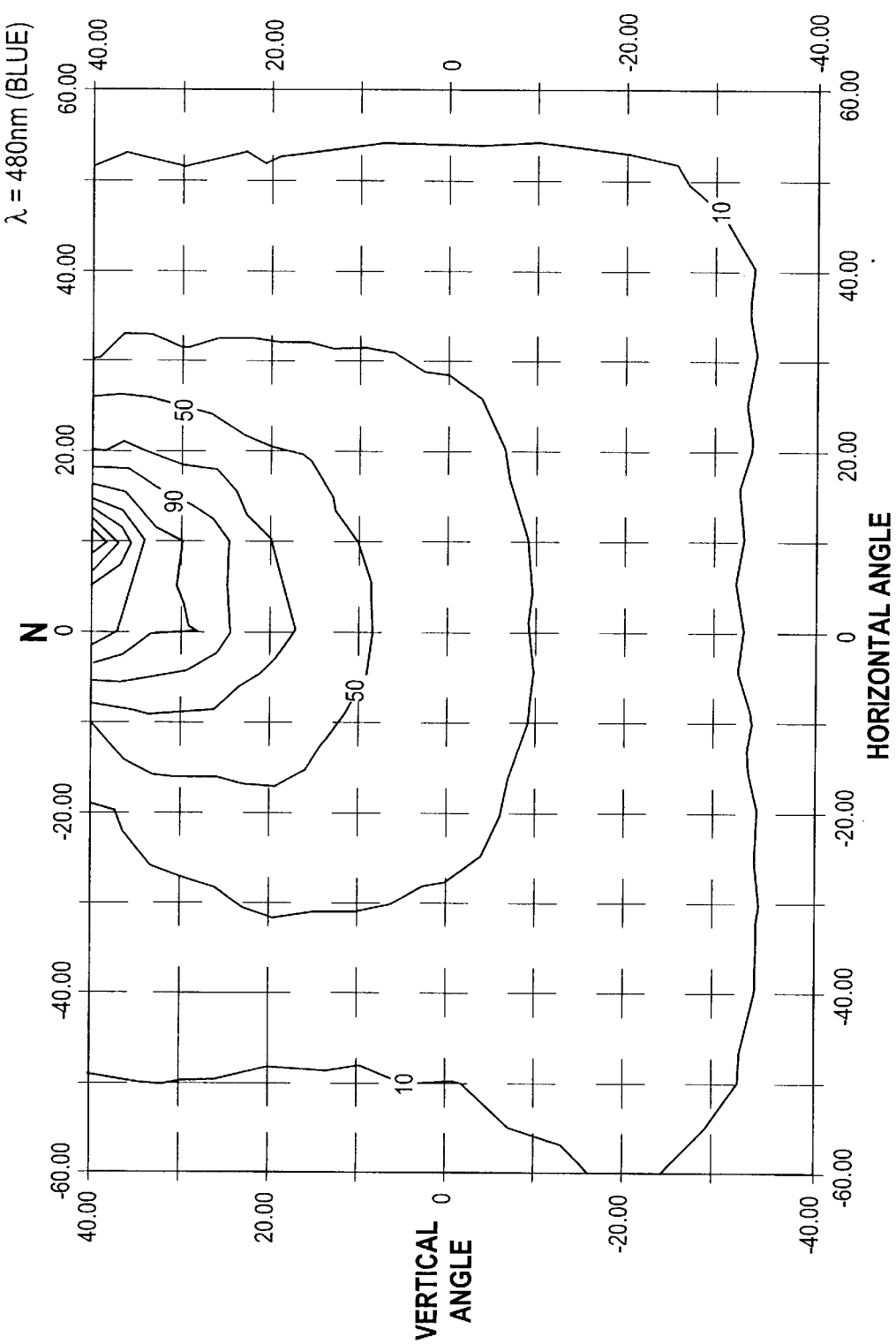

FIG. 10 is a computer simulation graph illustrating the contrast ratio curves of the color blue resulting from the prior art pixel shown in FIG. 4, wherein the retardation film has a retardation value of 275 nm.

FIG. 11 is a schematic diagram of the optical components of a first embodiment of an NB twisted nematic liquid crystal display pixel according to this invention. The first and second linear polarizers have transmission axes parallel to one another in direction $A_0$. The liquid crystal pixel has a first buffing zone having a direction $B_1$ substantially perpendicular to the transmission axes of the polarizers. The direction $A_0$ of the second buffing zone is substantially parallel to the transmission axes of the polarizers. The color filters and color personalized or patterned retardation films are disposed between the second buffing zone and the second or exit polarizer.

Figure 12:
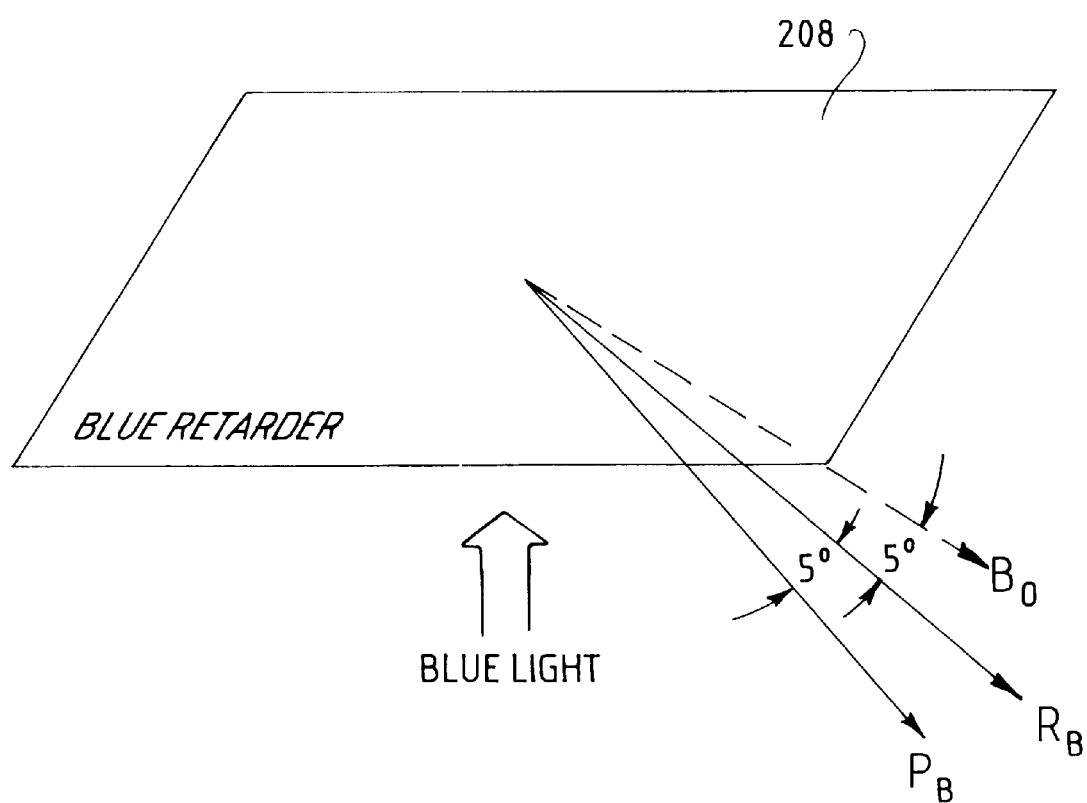

FIG. 12 is an optical diagram of the personalized blue retarder 208 according to the first embodiment of this invention wherein the blue retardation film 208 has its optical axis $R_B$ rotated clockwise from direction $B_0$, and wherein direction $B_0$ is substantially parallel to direction $B_1$.

Figure 13:
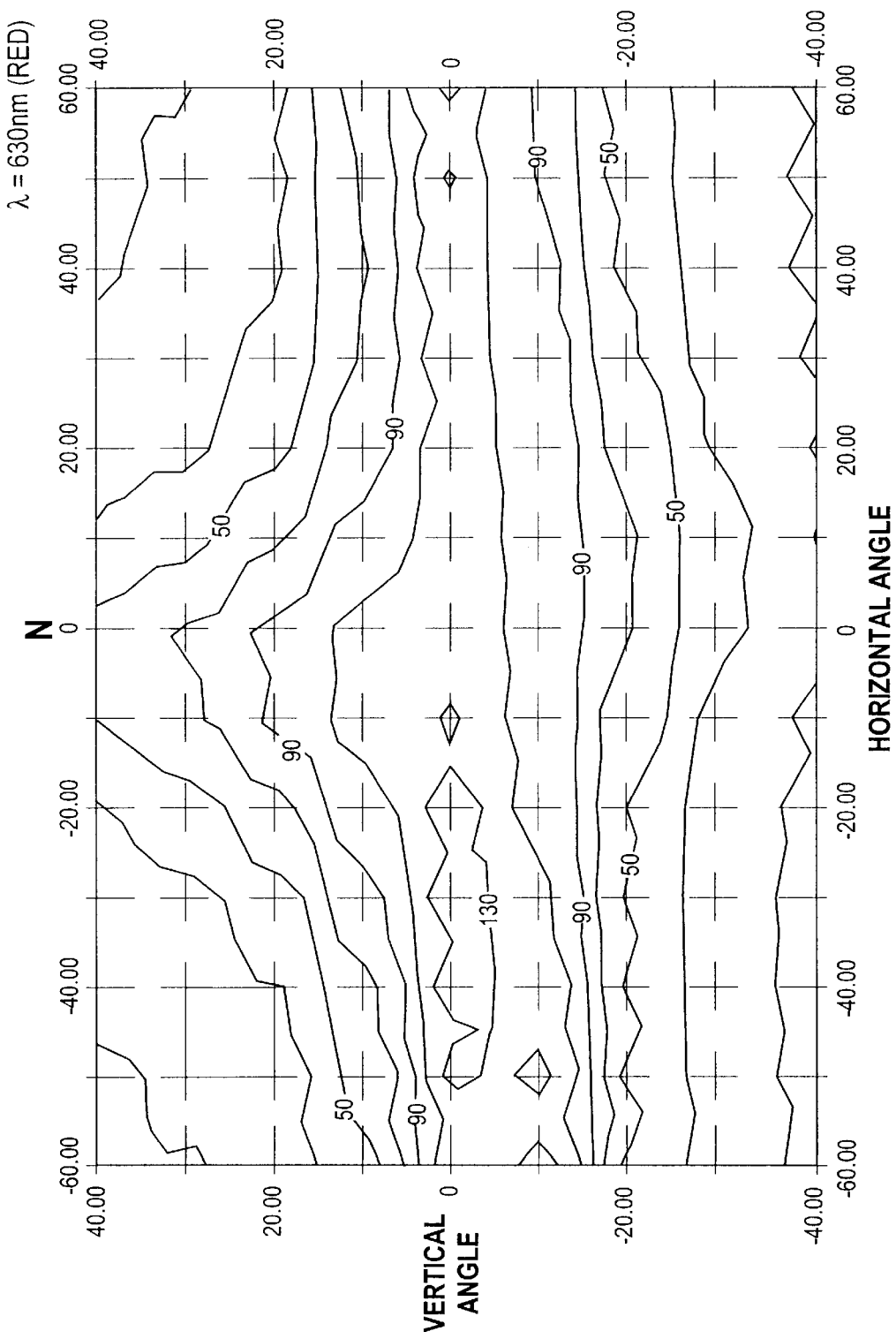

FIG. 13 is a computer simulation graph of the contrast ratio curves of the color red resulting from the pixel of the first embodiment of this invention illustrated in FIGS. 11 and 12 wherein the personalized red retardation film has a retardation value of 315 nm.

Figure 14:
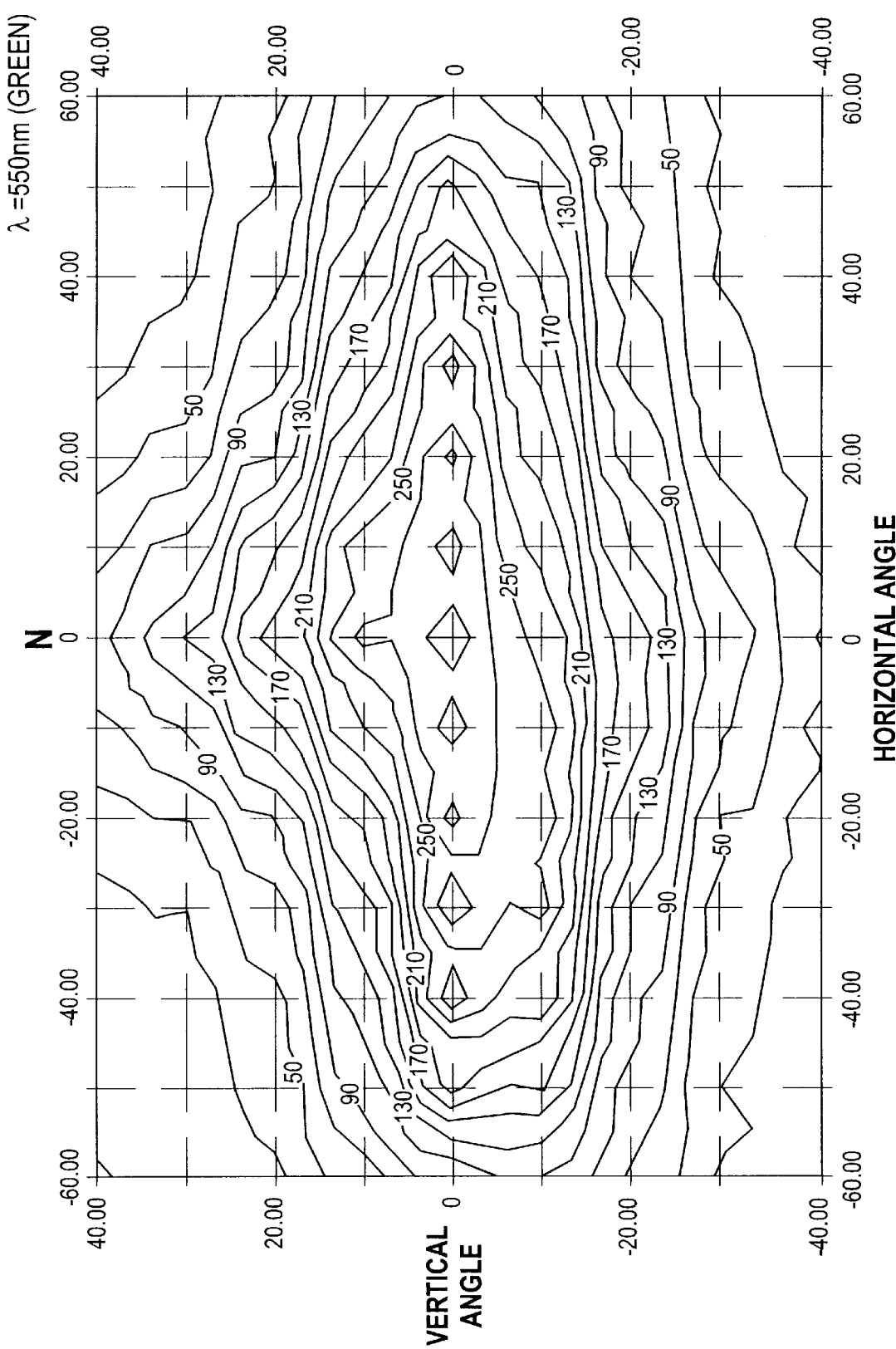

FIG. 14 is a computer simulation graph illustrating the contrast ratio curves of the color green resulting from the pixel of the first embodiment of this invention illustrated in FIGS. 11 and 12 wherein the personalized green retardation film has a retardation value of 275 nm.

Figure 15:
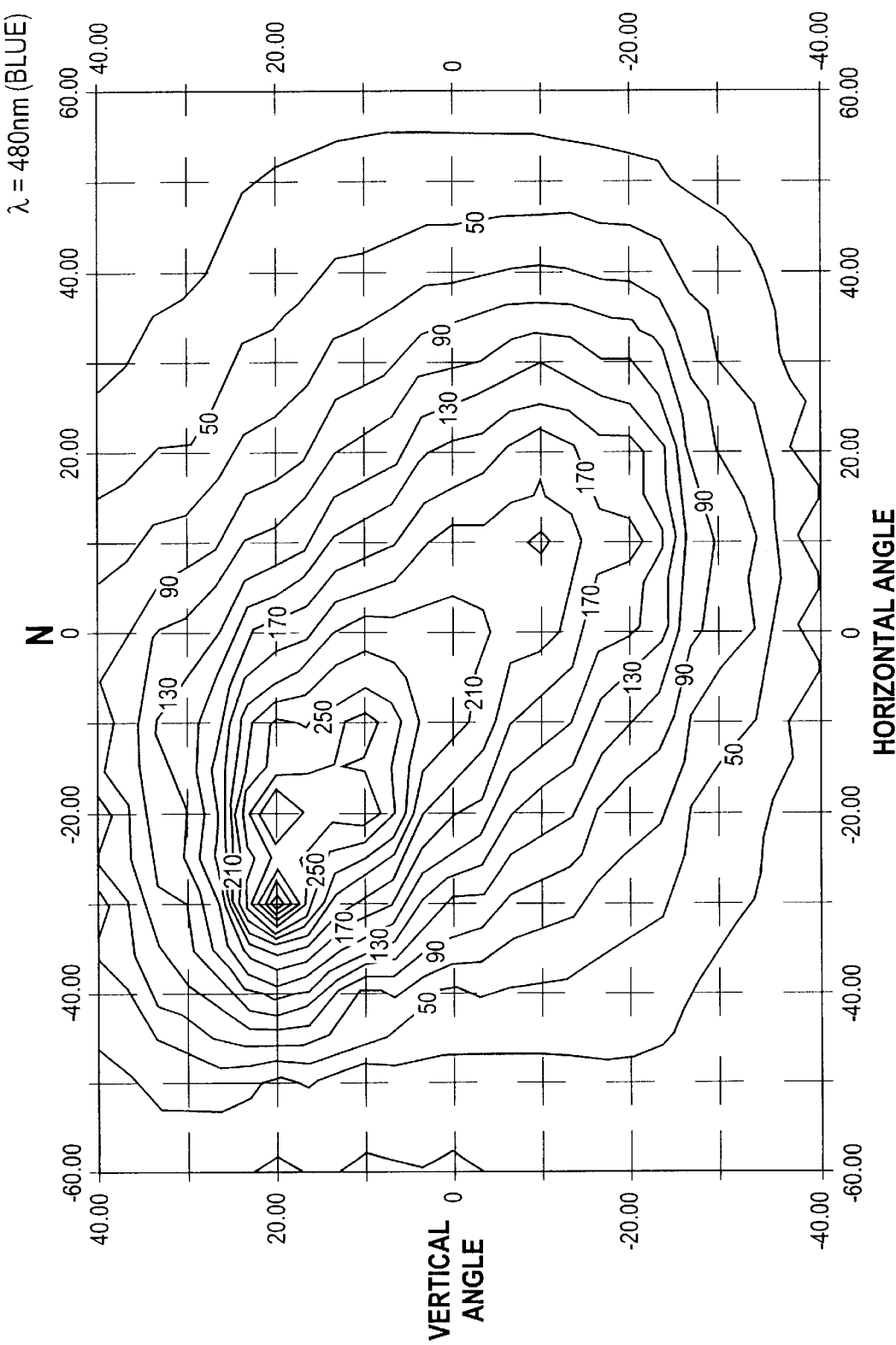

FIG. 15 is a computer simulation graph of the contrast ratio curves of the color blue resulting from the pixel of the first embodiment of this invention illustrated in FIGS. 11 and 12 wherein the personalized retardation film for the color blue has a retardation value of 240 nm.

FIG. 16 is a cross sectional view of a second embodiment of a twisted nematic liquid crystal display pixel according to the present invention. This second embodiment utilizes a personalized retardation film for each color subpixel, each film having a preselected retardation value and optical orientation selected in accordance with the color or wavelength of its subpixel. Each subpixel (e.g., red, green, and blue) of this second embodiment has a personalized or patterned retardation film made of the same material, but of different thicknesses thereby creating different retardation values matched to the particular wavelength of each subpixel. The personalized retardation films of this embodiment are located on the interior surfaces of the color filters.

FIG. 17 is a cross sectional view of a third embodiment of a twisted nematic liquid crystal pixel of this invention. This third embodiment utilizes personalized or patterned retardation films only in the red and green subpixels, with the blue subpixel free of any such film. Furthermore, the third embodiment is provided with a retardation film or layer having a constant birefringent and retardation value between the second substrate and the second polarizer.

Figure 18:
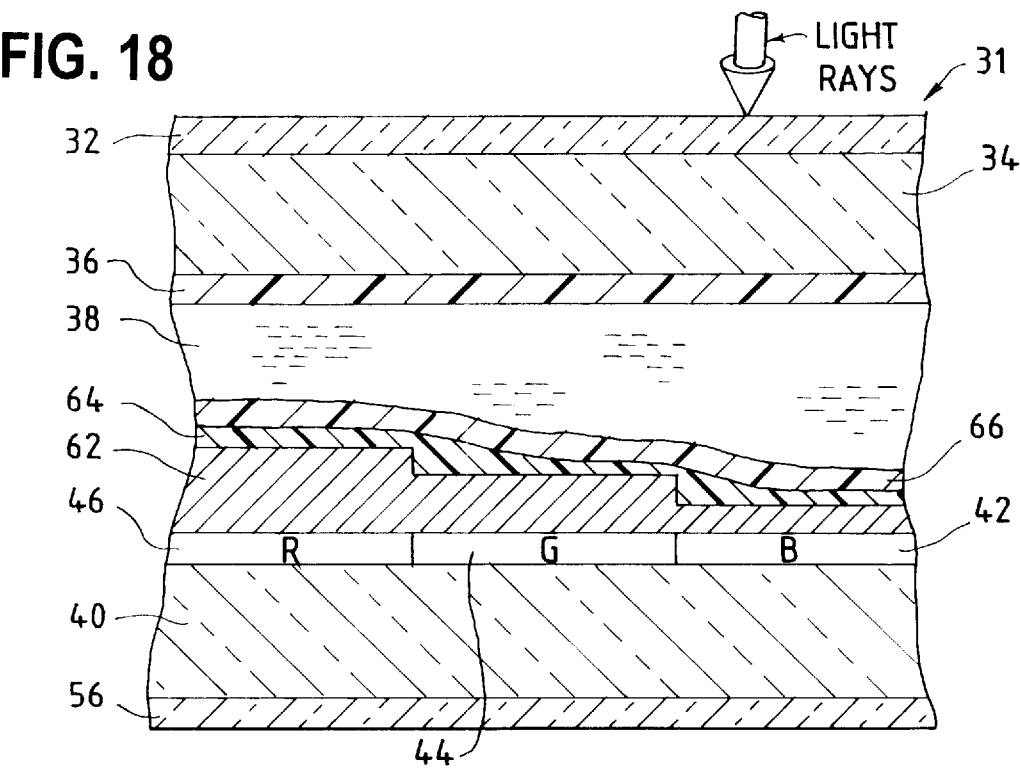

FIG. 18 is a cross sectional view of a fourth embodiment of a twisted nematic liquid crystal display pixel according to this invention. The personalized retardation film of the fourth embodiment has an upper terraced surface thereby defining different thicknesses and different retardation values for the retardation film in each subpixel.

Figure 19:
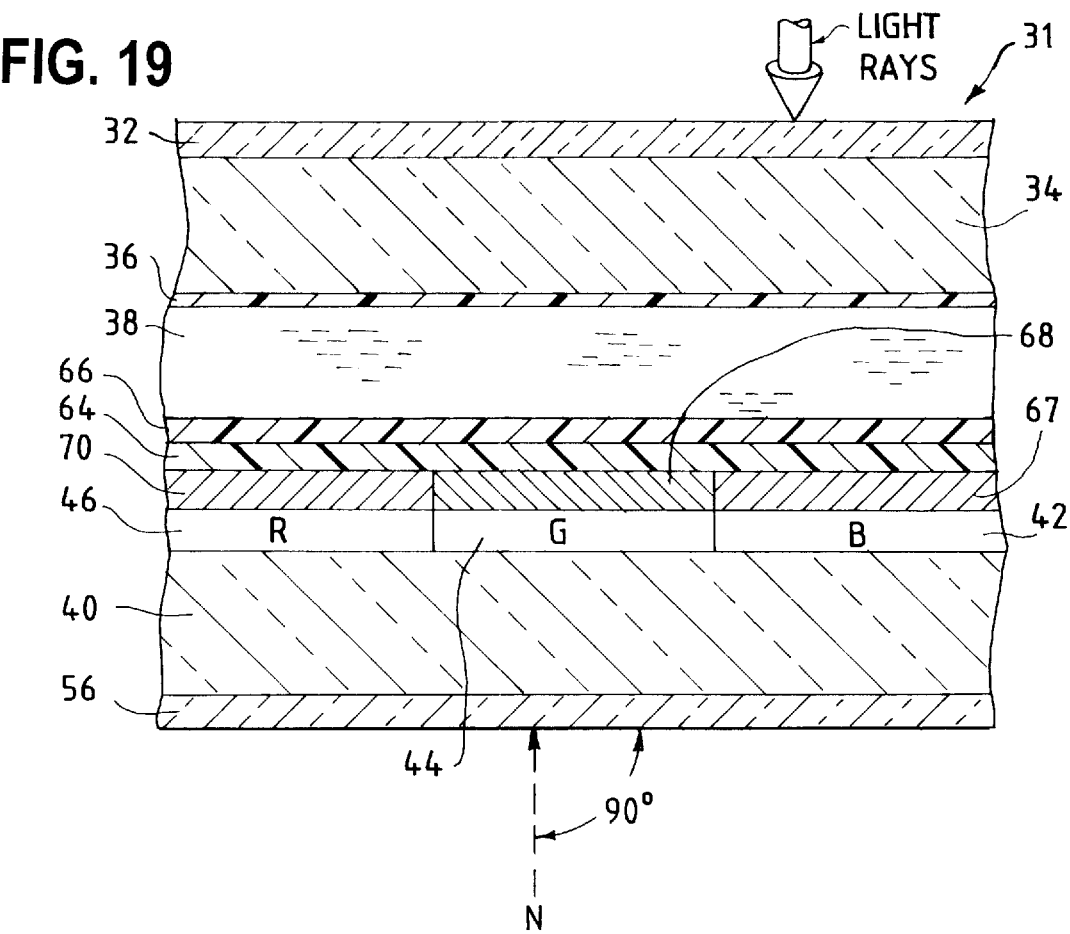

FIG. 19 is a cross sectional view of a fifth embodiment of a liquid crystal display pixel according to this invention. In the fifth embodiment, each subpixel has a personalized retardation film wherein the film of each subpixel is made of a different material preferably having a different birefringent and thus retardation value. The thicknesses of the retardation films in the fifth embodiment may be substantially equal or, alternatively, may be substantially different depending upon the birefringent values and required thicknesses of each subpixel.

Figure 20:
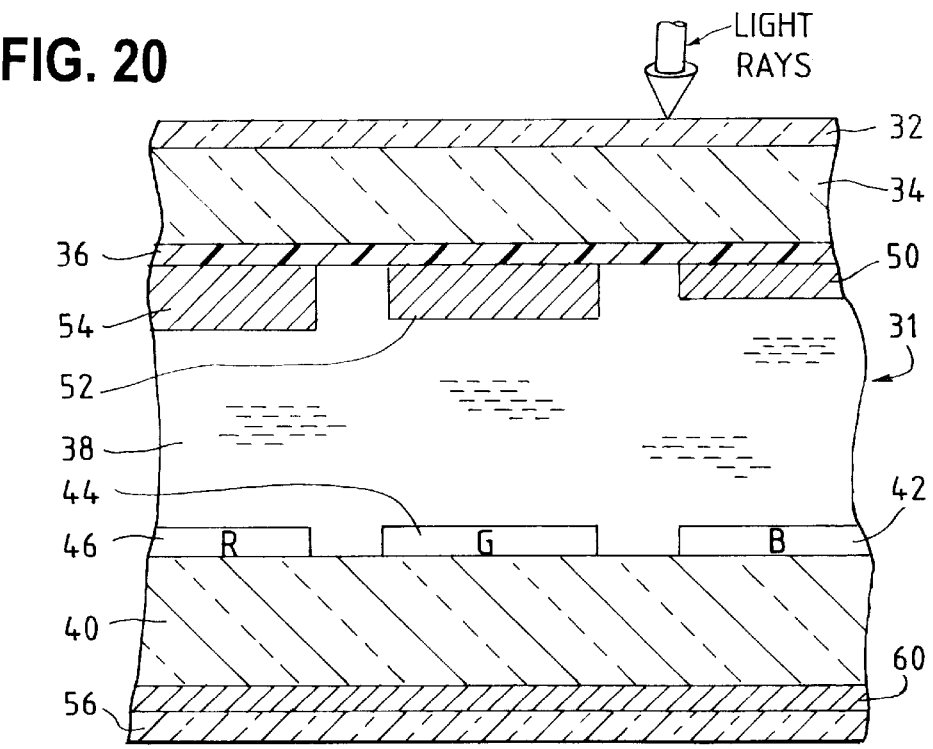

FIG. 20 is a cross sectional view of a sixth embodiment of a twisted nematic liquid crystal display pixel according to this invention. The sixth embodiment utilizes personalized retardation films located on the interior surface of the first substrate and an optical color filter for each subpixel located on the interior surface of the second substrate-whereby the color filters and retardation films are disposed on opposite sides of the liquid crystal layer.

Figure 21:
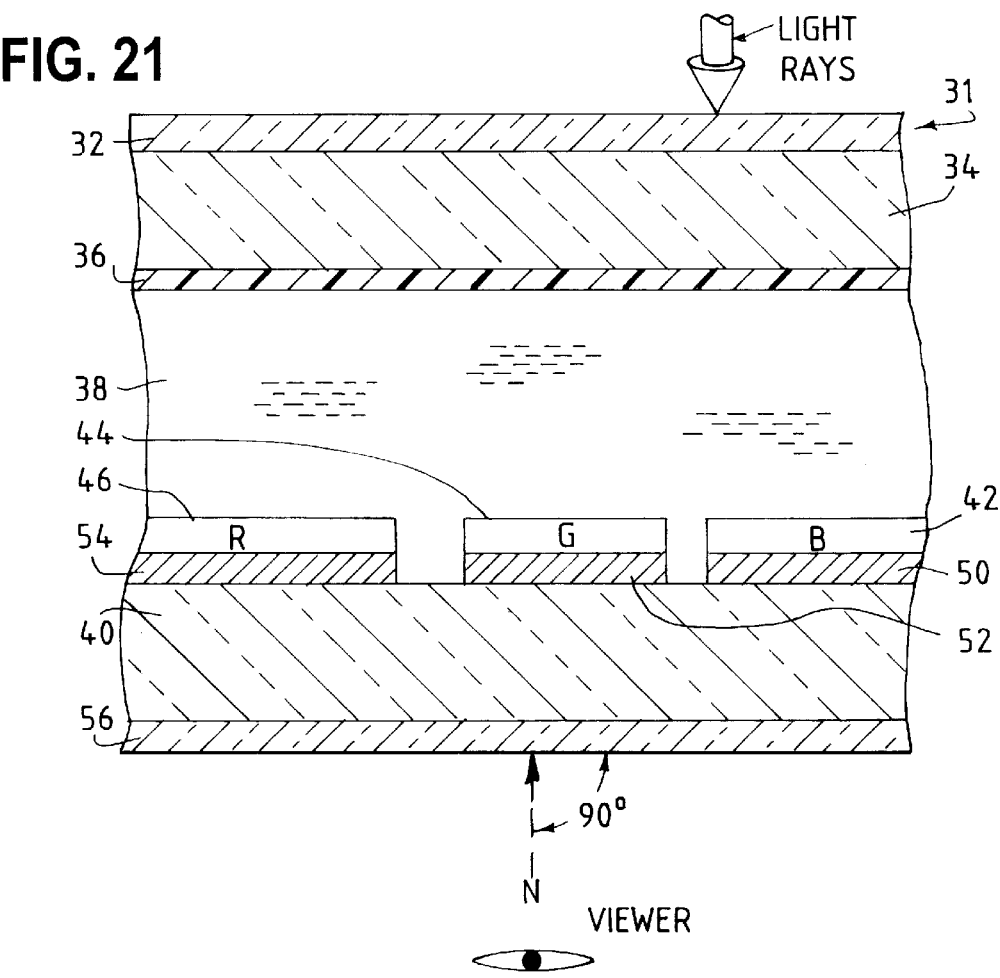

FIG. 21 is a cross sectional view of a seventh embodiment of a twisted nematic liquid crystal display pixel according to the present invention. The color personalized or patterned retardation films of the seventh embodiment are disposed on the exterior surfaces of the color filters thereby being located between the color filter of each subpixel and the second substrate thereof.

Figure 22:
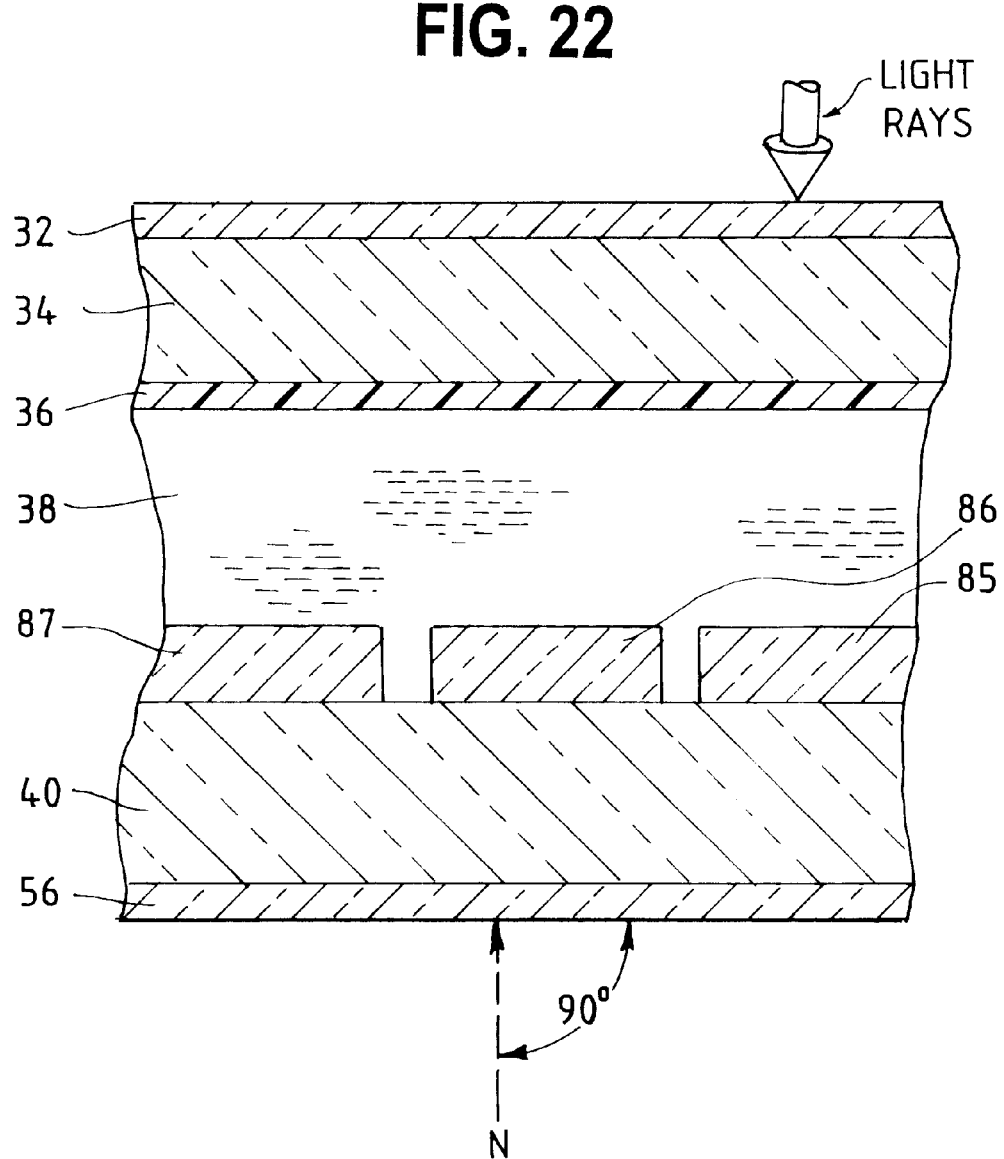

FIG. 22 is a cross sectional view of an eighth embodiment of this invention wherein a polymer or polyimide based film in each subpixel acts as both a color filter and a retarder.

Figure 23:
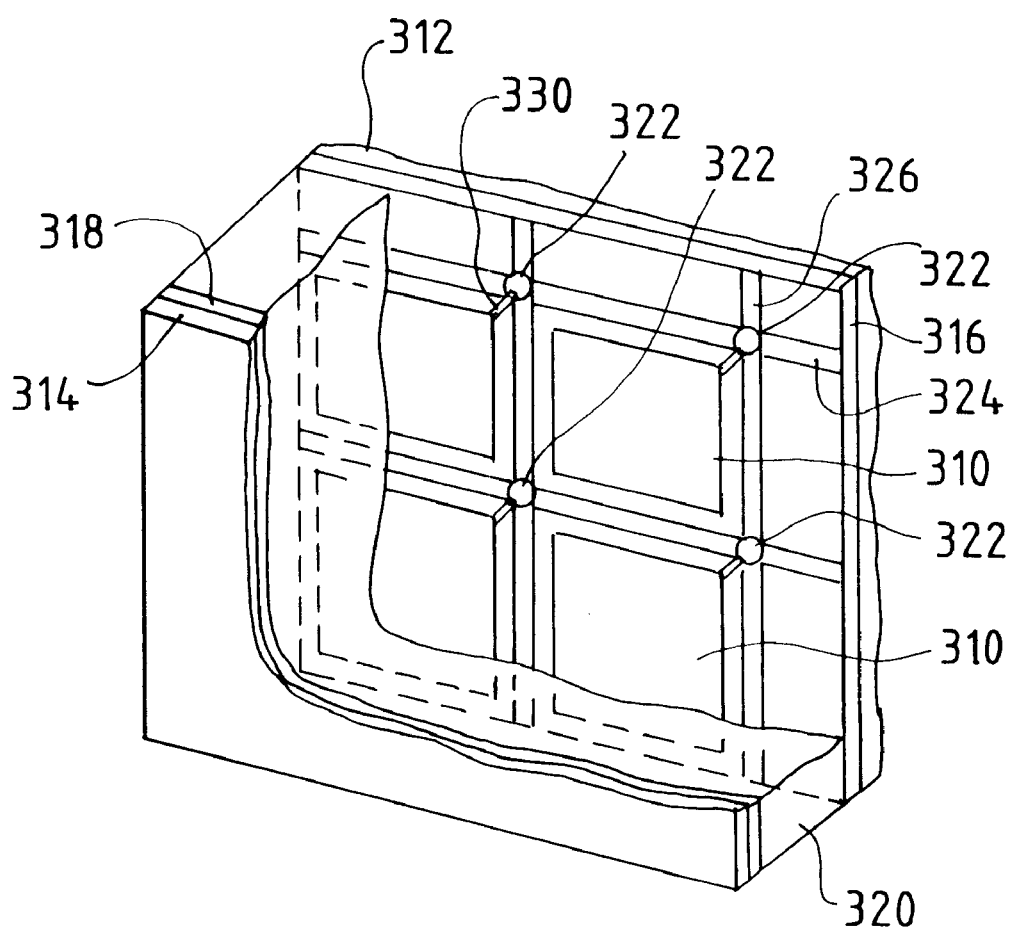

FIG. 23 is a partial cut-away view of an LCD including a plurality of pixels.

Figure 24:
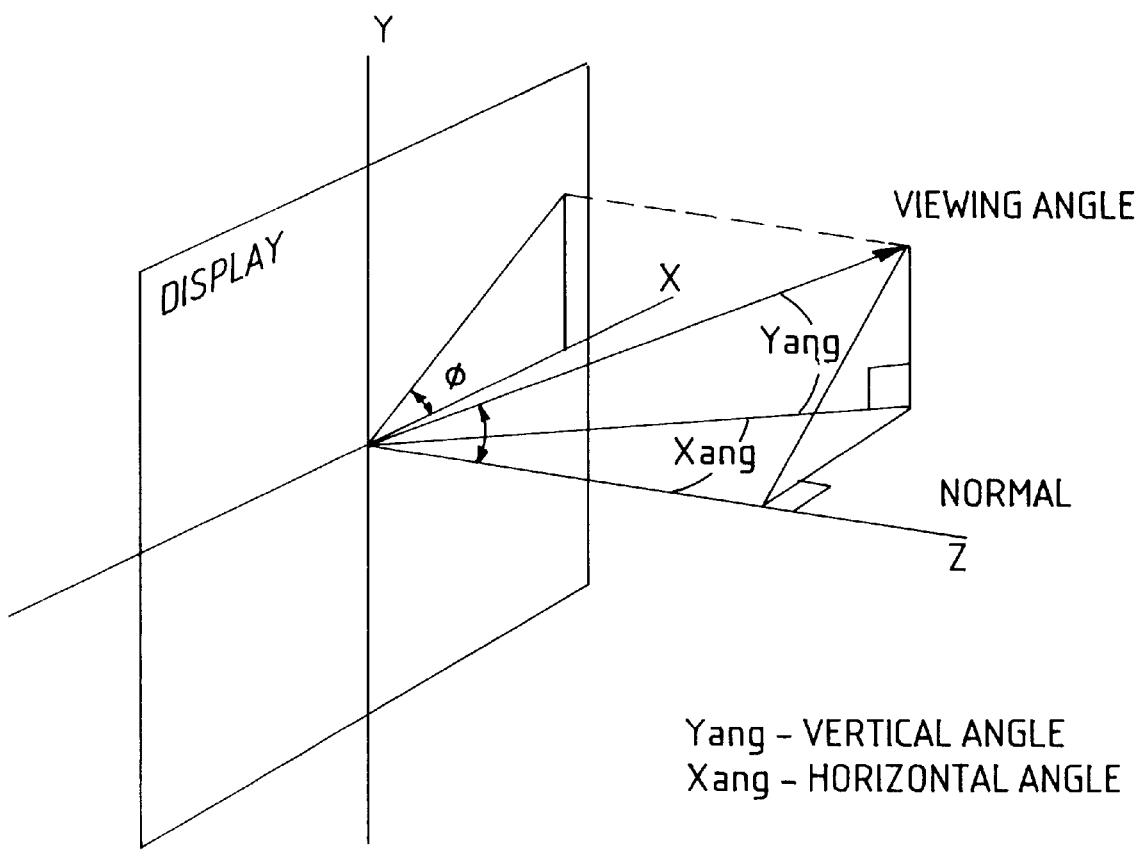

FIG. 24 is a graph illustrating the angular relationship between the horizontal and vertical angles discussed herein, and the conventional LCD angles $\phi$ and $\Theta$.

DETAILED DESCRIPTION OF CERTAIN EMBODIMENTS OF THIS INVENTION

FIG. 11 is a schematic view of an arrangement of a first embodiment of a liquid crystal display pixel according to this invention. The rear "X-buffed" normally black pixel shown in FIG. 11 includes a first polarizer 202, a first buffing or orientation film 204, a second orientation film 206, a personalized uniaxial blue retardation film 208, a personalized uniaxial green retardation film 210, a personalized uniaxial red retardation film 212, a blue color filter 214, a green color filter 216, a red color filter 218, and finally a second or exit polarizer 220. The retardation films of this first embodiment have positive birefringent and retardation values and are uniaxial. Such retardation films are commercially available and may be obtained from, for example, Nitto Corp., Japan, or Nitto Denko America, Inc., New Brunswick, N.J. Nitto supplies, for example, 315 nm retardation films having a model number NRF-RF 315.

A liquid crystal layer (not shown) is sandwiched between the first and second orientation films 204 and 206, wherein the liquid crystal layer, with no voltage applied thereto, twists incident light about 82°–100°. A first substrate (not shown) is disposed between the first linear polarizer 202 and the first orientation film 204, with a first electrode layer (not shown) being laminated between the first substrate (not shown) and the first orientation film 204. A second substrate (not shown) is preferably sandwiched between the color filters and the second linear polarizer 220. Furthermore, a second electrode layer (not shown) is preferably disposed between the second orientation film 206 and the personalized red, green, and blue retardation films.

The first and second linear polarizers 202 and 220 have transmission axes which are parallel to one another in a direction $A_0$ thereby defining a normally black pixel. The first orientation film 204 is oriented or buffed in a direction substantially perpendicular to the transmission axes of the linear polarizers 202 and 220, thereby defining a first buffing zone for orienting the molecules of the liquid crystal layer adjacent the orientation film 204 in a direction $B_1$. The second orientation film 206 has a buffing or orientation direction substantially perpendicular to direction $B_1$ and substantially parallel to direction $A_0$, thereby orienting the liquid crystal molecules adjacent the film 206 in a direction parallel to the transmission axes of the linear polarizers 202 and 220. The liquid crystal material of this particular embodiment is left handed in that it twists light passing therethrough in the clockwise direction.

The liquid crystal layer (not shown) of this first embodiment shown in FIG. 11 has a thickness of about 5.70 micrometers ($\mu$m) and is matched to the first transmission minimum of the green wavelength at 550 nm. Therefore, the thickness "d" of the liquid crystal layer is less than the first transmission minimum of the red color wavelength at 630 nm, and is greater than the first transmission minimum of the blue wavelength at 480 nm.

The normally black pixel of this first embodiment behaves optically in the following manner. Normally incident white light 201, including blue, green, and red wavelengths, first proceeds through the first linear polarizer 202 and is linearly polarized in direction $A_0$. After the light 201 is polarized by the first polarizer 202, it proceeds through the first transparent substrate (not shown) and the first electrode layer (not shown). After propagating through the first electrode layer, the linearly polarized light enters the liquid crystal layer (not shown) as ordinary light (as opposed to extraordinary light). The light entering the liquid crystal material is "ordinary light" because the first buffing zone of orientation film 204 is substantially perpendicular to the transmission axis of the first polarizer 202.

When the light reaches the first orientation film 204, it is polarized in direction $A_0$ which is substantially perpendicular to the buffing direction $B_1$ of the first orientation film 204. Due to the perpendicular orientation of the buffing directions of the first and second orientation films 204 and 206, the light is twisted by the OFF state liquid crystal material to an extent of about 82°–100° as it proceeds therethrough. As can be seen from the buffing directions of the first and second orientation films 204 and 206, the polarization direction of the red, green.; and blue light is twisted clockwise by the left handed liquid crystal material and is polarized in a direction $B_0$ plus or minus about 8° or less when it reaches the exit end of the liquid crystal material and proceeds through the second orientation film 206.

Because the cell gap "d" of the liquid crystal material is matched to the first transmission minimum of the wavelength of the color green, the normally incident green wavelength of light which passes through the liquid crystal material is twisted about 90° in the clockwise direction and is polarized in direction $B_0$ when it reaches the green personalized retardation film 210. Because the cell gap "d" is greater than the first transmission minimum for the color blue at a wavelength of about 480 nm, the normally incident blue light is twisted by the liquid crystal material to an extent substantially greater than 90° (e.g. about 92°–100°). If not for the blue retardation film of this embodiment, the overtwisted portion of the blue light would leak through the second polarizer when the pixel was in the OFF state. Accordingly, the blue wavelength of light, when it reaches the personalized or patterned blue retardation film 208, is not polarized in direction $B_0$, but is polarized in a direction $P_B$ which is rotated clockwise relative to direction $B_0$.

Likewise, because the liquid crystal material cell gap "d" is less than the first transmission minimum for the color red, normally incident light at the red wavelength of about 630 nm is only twisted about 82°–88° by the liquid crystal material and therefore is not polarized in a direction $B_0$ when it reaches the red personalized retardation film 212. The red light is instead polarized in a direction $P_R$ which is rotated counterclockwise relative to direction $B_0$, when it reaches the personalized red retardation film 212.

The incident light, after being retarded by the color personalized retardation films, then proceeds through the blue, green, and red color filters 214, 216, and 218. Finally, after passing through the color filters, the incident light reaches the second or exit polarizer 220 adjacent the viewer which has a transmission axis parallel to that of the first linear polarizer 202. Normally incident light, of the blue, green, and red wavelengths, will at this point, assuming the pixel is in the OFF state, be substantially polarized in a direction $B_0$ and will therefore be absorbed by the second linear polarizer 220, thereby creating a darkened or OFF state pixel thereby substantially eliminating different color leakage at different viewing angles.

Data is displayed through the NB pixel of this first embodiment, as in conventional NB twisted nematic liquid crystal display pixels, by selectively transmitting a variable voltage across the liquid crystal material. When a voltage is applied across the liquid crystal material, the LC molecules are aligned in the direction of the electric field in accordance with the strength of the voltage, and the twist effect does not occur, thereby giving rise to light polarized in the direction $A_0$ when it reaches the second linear polarizer 220. Light polarized in direction $A_0$ when it reaches the second or exit linear polarizer 220 will be transmitted therethrough creating a color display.

The color personalized or patterned retardation films 208, 210, and 212 of this first embodiment all have different retardation values (d·$\Delta$N). The retardation value of each color personalized retardation film 208, 210, and 212 of this particular embodiment is selected by providing each color subpixel with a half wave plate retarder. In other words, because the red wavelength is 630 nm, the retardation value of the personalized red retardation film 212 will be about 315 nm. Likewise, because the green wavelength is 550 nm, the personalized green retardation film 210 will have a retardation value of about 275 nm. Also, because the blue color wavelength is 480 nm, the personalized or patterned blue retardation film 208 will have a retardation value of about 240 nm. Therefore, the retardation film for each colored subpixel has a different retardation value chosen in accordance with the color wavelength of the subpixel.

In this particular embodiment, the blue retardation film 208 has the lowest retardation value at about 240 nm, and the red color personalized retardation film 212 has the highest retardation value at about 315 nm. However, in other particular embodiments of this invention, this need not be the case, and, for example, the blue personalized retardation film may have a higher retardation value than the green and red retardation films. Furthermore, as will be clear to those of ordinary skill in the art, the different embodiments of this invention may be used in conjunction with any combination of colors, not just red, green, and blue.

Another important aspect of this invention is the orientation of the optical axis of each of the color personalized retardation films 208, 210, and 212. In this particular embodiment of this invention, the green personalized retardation film 210 has its optical axis $R_G$ oriented in a direction substantially parallel to direction $B_0$ because the cell gap "d" of the liquid crystal layer is matched to the first transmission minimum of the green wavelength and the green wavelength of light is therefore twisted about 90° by the liquid crystal layer.

However, because the cell gap of the liquid crystal material is greater than the first transmission minimum for the blue wavelength, and the blue light is twisted to an extent greater than about 90°, the personalized blue retardation film 208 has its optical axis oriented in a direction $R_B$ which is half-way between the polarization direction $P_B$ of the blue light when it reaches the retardation film 208 and the direction $B_0$ which is parallel to the first buffing direction $B_1$. By orienting the optical axis $R_B$ of the blue personalized retardation film 208 in a direction about half-way between directions $P_B$ and $B_0$ and providing the personalized blue retardation film 208 with a retardation value equal to about one-half the blue wavelength, the so-called over-twisting of the blue light by the liquid crystal material is compensated for and the retardation film 208 acts to shift the polarization direction of the blue light from direction $P_B$ back into a direction substantially parallel to direction $B_0$ after the light proceeds through the film 208.

In this particular first embodiment of this invention, the liquid crystal material twists the blue wavelength about 100°, and therefore the orientation axis $R_B$ of the blue retardation film 208 is oriented in a direction about 5° clockwise relative to direction $B_0$. Therefore, as a result of the correcting nature of the blue retardation film 208, the polarization directions of both the blue and green light are substantially parallel to one another as they enter the blue and green color filters 214 and 216.

Likewise, because the liquid crystal layer thickness "d" is less than the first transmission minimum of the red wavelength at 630 nm, normally incident red light is twisted to an extent less than about 90° (e.g. about 82°–88°) by the liquid crystal material as it passes therethrough. The polarization direction $P_R$ of the red light when it reaches the personalized retardation film 212 is therefore rotated or oriented counterclockwise relative to direction $B_0$. The red retardation film 212, having a retardation value of about 315 nm, has its optical axis $R_R$ oriented in a direction half-way between the red light polarization direction $P_R$ as it exits the liquid crystal material and the direction $B_0$ which is substantially parallel to the buffing direction $B_1$ of the first orientation film 204. In this particular embodiment of this invention, the pre-retardation actual polarization direction $P_R$ of the red light is about 8° counterclockwise relative to direction $B_0$, and the retardation film optical axis direction $R_R$ is about 4° counterclockwise relative to the direction $B_0$.

By providing the red personalized or patterned retardation film 212 with an appropriate half-wave retardation value (315 nm in this embodiment) and an optical axis $R_R$ orientated half-way between directions $B_0$ and $P_R$, the polarization of the red wavelength is shifted by the retardation film 212 to a direction substantially parallel to $B_0$ as it exits the personalized red retardation film 212.

Therefore, the polarization directions of each of the blue, green, and red wavelengths are substantially parallel to one another as they exit their respective personalized retardation films and enter their color filters 214, 216, and 218. This is accomplished, as described above, by providing each personalized retardation film with a retardation value chosen in accordance with the wavelength of each color, and orienting the optical axes of the respective retardation films in appropriate directions as discussed above. By properly selecting personalized values for the different retardation films of this embodiment and orienting their respective optical axes in accordance with the wavelength of each subpixel, one can nearly eliminate different color leakages at different viewing angles. This is accomplished by substantially lining up the viewing zones of each subpixel in the same viewing angle areas as shown in below-discussed FIGS. 13–15.

As will be realized by those skilled in the art, the cell gap "d" need not be matched to the first transmission minimum of a subpixel color. In such a case, the personalized retardation films could be arranged to compensate for such an arrangement in accordance with the teachings of this invention.

Of course, the first embodiment of this invention could also be practiced with right handed liquid crystal material which twists the light in the counterclockwise direction as it passes therethrough. In such a case, the directions $R_R$ and $P_R$ would be oriented clockwise relative to $B_0$, and directions $R_B$ and $P_B$ would be oriented counterclockwise to direction $B_0$. In other words, the optical axes of the red and blue retardation films would be substantially mirrored symetrically about the $B_0$ axis or direction.

Furthermore, the first embodiment of this invention would also produce excellent results if the first and second polarizers were each rotated about 90° in either direction, thereby defining a front "X-buffed" NB pixel.

FIG. 12 is a close-up view of the personalized blue retardation film 208 of the first embodiment shown in FIG. 11. As can be seen in FIG. 12, direction $B_0$ is parallel to the buffing direction $B_1$ of the first orientation film 204 and is perpendicular to the transmission axes directions $A_0$ of the linear polarizers 202 and 220. Direction $B_0$ is also parallel to the green polarization direction as it exits the liquid crystal material and reaches its personalized retardation film 210 and the green retardation axis $R_G$. Direction $P_B$ is the actual polarization direction of the blue light as it exits the liquid crystal material and reaches the personalized blue retardation film 208. In accordance with the first embodiment of this invention, the optical axis $R_B$ of the blue personalized retardation film 208 is chosen to be oriented in a direction half-way between directions $B_0$ and $P_B$. Orientation of the blue retardation film axis $R_B$ in this direction acts to shift the polarization direction of the blue light as it passes through the retardation film 208 from direction $P_B$ to a direction substantially parallel to direction $B_0$ as it exits the blue retardation film 208 and proceeds towards the blue color filter 214.

The optical orientation and values of the elements described in the first embodiment of this invention may, of course, be used in combination with the structural arrangements described in other certain embodiments of this invention (e.g. the second, fourth, fifth, sixth, seventh, and eighth embodiments described herein).

FIGS. 13–15 are computer simulation graphs which illustrates the contrast ratios resulting from the first embodiment of this invention illustrated in FIGS. 11 and 12.

FIG. 13 illustrates the contrast ratio curves for the red wavelength of 630 nm wherein the cell gap "d" is 5.70 micrometers ($\mu$m) and matched to the first transmission minimum of the color green at a wavelength of 550 nm. This graph also uses parameters including an ON voltage of 4.0 volts, an OFF voltage of 0.2 volts, a personalized red retardation film having a retardation value of 315 nm, and a red retardation film axis direction $R_R$ rotated or oriented 4° in the counterclockwise direction relative to direction $B_0$. As can be seen by the contrast ratio graph for the color red shown in FIG. 13, the contrast ratio at normal (0° vertical, 0° horizontal) is about 110–120:1. Along the horizontal 0° axis, the 30:1 contrast ratio curve extends upward to a vertical viewing angle of greater than 40° and downward to a vertical viewing angle of about −33°. This is, of course, a significant improvement over the contrast ratio curves for the color red illustrated in FIGS. 5 and 8. The improvement is a result of the red personalized retardation film including its retardation value and orientation axis of the first embodiment of this invention. As can also be seen by the red contrast ratio graph illustrated in FIG. 13, the contrast ratio along the 0° vertical axis is greater than 100:1 through horizontal angles of both −60° and +60°. This also is a significant improvement over the red contrast ratio curves illustrated in FIGS. 5 and 8.

FIG. 14 illustrates the contrast ratio curves for the green wavelength of 550 nm resulting from the first embodiment of this invention shown in FIG. 11 and 12. The FIG. 14 computer simulation graph utilizes parameters including a cell gap of 5.70 micrometers, a personalized green retardation film having a retardation value of 275 nm, a personalized green retardation film optical axis direction $R_G$ extending in a direction $B_0$ which is perpendicular to the transmission axes direction $A_0$ of the two linear polarizers 202 and 220, a driving ON voltage of 4.0 volts, and an OFF voltage of 0.2 volts. The graph of FIG. 14 is similar to that illustrated in FIG. 9 because the cell gap of 5.70 micrometers of the liquid crystal display of the first embodiment is matched to the first transmission minimum of the color green.

However, it will be understood by those of ordinary skill in the art that the cell gap need not be matched to the first transmission minimum of any colored subpixel. In such a case, one way in which to compensate for such is to provide for the orientation of the personalized retardation film optical axes of this first embodiment to be rotated in order to compensate for the non-matching cell gap.

As can be seen in FIG. 14, the contrast ratio of the green wavelength in the first embodiment of this invention is about 270:1 at normal, with the 30:1 contrast ratio curve extending off the graph along both 0° axes. This is a significant improvement over the green contrast ratio curve shown in FIG. 6.

FIG. 15 illustrates the contrast ratio curves of the blue wavelength resulting from the first embodiment of this invention illustrated by FIGS. 11 and 12. The parameters for this graph are the same as those described with respect to the graphs of FIGS. 13–14. The contrast ratio at normal is about 220:1 for the blue wavelength which is a significant improvement over the blue wavelength contrast ratios at normal shown in FIGS. 7 and 10. Along the 0° horizontal viewing axis, the 30:1 contrast ratio curve extends upward off the graph to an angle greater than 40°, and downward to a vertical viewing angle of about −38°. Along the 0° vertical axis the 30:1 contrast ratio curve extends from the horizontal viewing angles of about −48° to +56°. Again, this is a significant improvement over the blue contrast ratio curves of FIGS. 7 and 10.

As can be seen from the contrast ratio graphs of FIGS. 13–15, the contrast ratio curves of all three colors are very good in that they all have high contrast ratios at normal and the 30:1 contrast ratio curve for all colors extends horizontally and vertically to significant extents in all directions. This results in a substantial elimination of different color leakages at different viewing angles, including the normal viewing angle, because the improved high contrast ratio viewing zones of all three colors are substantially angularly aligned with one another. This is a significant improvement over the prior art because particular embodiments of this invention, such as that shown in FIGS. 11 and 12, allow one to eliminate the multi-gap need of matching the cell gap "d" to the first transmission minimum of multiple colors, while still providing for superior contrast ratio curves for all requisite colors. This first embodiment eliminates the need of the multi-gap configuration shown in FIG. 1 and compensates for the wavelength of each color by personalizing or patterning the retardation values and orientations of personalized retardation films provided for each subpixel.

The color wavelengths used in the computer simulations and certain embodiments of this invention are merely illustrative. Those skilled in the art will readily realize that embodiments of this invention may be carried out using different color wavelengths.

FIG. 16 is a cross sectional view of a second embodiment of a twisted nematic liquid crystal display (TNLCD) pixel according to the present invention. The TNLCD of this embodiment may be either of the normally black or normally white type, depending on the orientation of the below discussed polarizers. The liquid crystal material may twist normally incident light anywhere in the range of about 80°–270°, but preferably about 82°–100°. Optical radiation 30 from a radiation source is applied to the liquid crystal display pixel.

The applied optical radiation 30 is typically from a single white light source which irradiates light through each subpixel of the pixel shown in FIG. 16. The pixel 31 includes a red subpixel, a green subpixel, and a blue subpixel. However, it should be noted that a greater or lesser number of different colored subpixels may be utilized with the color of each subpixel being chosen according to the specific intended use of the pixel. The optical radiation 30 first passes through a first linear polarizer 32. The optical radiation after passing through the first linear polarizer 32 then passes through the first transparent substrate 34. The transparent substrate 34 consists essentially of, for example, glass, quartz, plastic, or the like (most preferably glass).

The optical radiation 30 then proceeds through the transparent active matrix 36 which includes pixel electrodes therein. The active matrix 36 includes therein an electrode corresponding to each subpixel, as illustrated for example by elements 18a, 18b, and 18c in FIG. 1 herein. The active matrix 36 and pixel electrodes therein are transparent thereby allowing the optical radiation 30 to pass therethrough.

The optical radiation then proceeds into the twisted nematic liquid crystal layer 38 which is sandwiched between the first transparent substrate 34 and a second transparent substrate 40. The thickness "d" of the liquid crystal layer 38 is preferably less than about 10 μm and most preferably about 5–7 μm, although any thickness "d" may be used in conjunction with this invention. For example, any thicknesses super-twisted liquid crystal display cell may be used. The liquid crystal layer 38 of this embodiment preferably twists the polarized radiation about 82°–100° when the pixel is in the OFF or unenergized state. The degree of twist depends on the alignment of the buffing zones (not shown), the thickness "d" of the LC material, and the wavelength of light being twisted.

On the interior surface of the first substrate 34 is the aforesaid mentioned active matrix 36 preferably including ITO pixel electrodes therein. These electrodes are preferably connected to thin film transistors (not shown) arranged in a matrix array for selectively energizing the pixel electrodes. These thin film transistors (not shown) act as switching devices. The electrodes within the active matrix 36 selectively apply a variable electric field to the liquid crystal material 38 of each subpixel of the pixel 31 thereby allowing selected data images to be displayed. Driving schemes for driving the active matrix LCD of this invention are known throughout the art and are disclosed, for example, in U.S. Pat. Nos. 4,855,724 and 4,830,468, the disclosures of which are hereby incorporated herein by reference.

The various embodiments of this invention will also work in combination with LCDs driven by diodes, mims, etc., whether or not they are of the active matrix type. Plasma addressed LCDs may also be used in conjunction with certain preferred embodiments of this invention.

In the second embodiment of this invention, a blue optical filter 42 is provided in the blue subpixel, a green optical filter 44 is provided in the green subpixel, and a red optical filter 46 is provided in the red subpixel. The color filters 42, 44, and 46 are coupled to the interior surface of the second glass substrate 40 in this particular embodiment. Deposited on the interior surface of the color filter of each subpixel is a color personalized retardation film 50, 52, and 54 selected according to the wavelength of the color of each subpixel.

The blue subpixel retardation film 50 deposited on the blue optical filter 42 has a retardation value and preferably but not necessarily an orientation axis direction selected according to the optical wavelength of the color blue. The green subpixel retardation film 52 is deposited on top of the green optical filter 44 and has a retardation value and an orientation axis direction preferably chosen in accordance with the commonly known wavelengths of the color green. The red subpixel retardation film 54 deposited on the red color filter 46 has a birefringent and retardation value, and an orientation axis direction preferably chosen in accordance with the wavelength of the color red.

In certain embodiments of this invention the orientation axes of the personalized retardation films are substantially parallel to one another, while in other embodiments they are substantially not parallel to one another as in the first embodiment of this invention.

As will be clear and well known to those of skill in the liquid crystal display art, red, green, and blue colors of optical radiation 30 have different wavelengths ($\lambda$). Accordingly, as discussed above, the retardation film of each subpixel is particularly selected in accordance with the color wavelength of each particular subpixel because the liquid crystal layer 38 affects or retards each wavelength to a different extent.

The values and optical axis orientations of the retardation films of the color subpixels are chosen so as to compensate for the different wavelength of each color. This retardation film wavelength compensation eliminates the need for the multi-gap approach of FIG. 1. Accordingly, the personalized retardation films of this invention compensate for the different twisting and retardation of the different wavelengths.

Also, the retardation film 50 of the blue subpixel in certain particular embodiments of this invention has a first retardation value less than the values of the retardation films 52 and 54 in the green and red subpixels. Likewise, the retardation film 52 of the green subpixel in certain particular embodiments of this invention has a second retardation value different than those of the red and blue subpixels, and the retardation film 54 of the red subpixel in certain particular embodiments of this invention has a retardation value chosen in accordance with the wavelength of the color red whereby the retardation value of the red retardation film 54 is larger than the respective birefringent values of the retardation films of the blue and green subpixels. Therefore, in certain particular embodiments of this invention the retardation film of the red subpixel has the largest retardation value while the retardation film 50 of the blue subpixel has the smallest retardation value. The retardation value, of course, may be changed by adjusting the thickness, the birefringence, or both.

As a result of the personalized retardation films, the phase shift of the liquid crystal material 38 is substantially matched to the wavelength of each particular color by use of the personalized retardation films 50, 52, and 54, instead of by matching the thickness "d" of the cell to the first transmission minimum of each color. By matching via retarders the phase shift of each subpixel to its particular wavelength, the need for the multi-gap configuration (see FIG. 1) where (d·$\Delta$N)÷$\lambda$ is matched to the first transmission minimum of each particular wavelength by varying the cell gap "d," is eliminated. By following the teachings of this invention, the Gooch-Tarry principles of matching (d·$\Delta$N)÷$\lambda$ to the first transmission minimum of each wavelength need no longer be followed in order to achieve superior contrast ratios for a plurality of wavelengths.

The retardation values of each retardation film of the respective subpixels in certain embodiments of this invention may be varied by using one material for all retardation films 50, 52, and 54, and varying the thickness thereof to create different retardation values. As the thickness of a retardation film of a selective material increases, so does the retardation value of the film. Therefore, one needs simply to thicken a particular retardation film in order to increase its retardation value.

Alternatively, the retardation values of the retardation films 50, 52, and 54 in certain embodiments of this invention may be changed by using different materials. It is known that different retarding materials have different birefringent values. Therefore, a first material could be used for the retardation film 50 of the blue subpixel, a second material for the retardation film 52 of the green subpixel, and a third material for the retardation film 54 of the red subpixel, wherein the first, second, and third materials all have different birefringent and/or retardation values selected in accordance with the color of each subpixel.

As stated above, the thickness of each retardation film or layer depends upon the required birefringent value of that particular film which is to be selected in accordance with the wavelength of that particular subpixel.

With respect to the materials to be used for the retardation films of this invention, both positive and negative birefringent retarders are known in the art and both may be used in certain embodiments of this invention. U.S. Pat. No. 4,138,474, hereby incorporated herein by reference, discloses multiple positive and negative birefringent retardation films which may be used as the retardation films of this invention. Also, U.S. Pat. No. 5,071,997, hereby incorporated herein by reference, discloses a class of soluble polyimides and co-polyimides made from substituted benzidines and aromatic dianhydrides and other aromatic diamines which may be used in forming retardation films with negative birefringence. The polyimides of U.S. Pat. No. 5,071,997 which are soluble may be spin coated directly onto the color filters or other appropriate layers in certain embodiments of the instant invention. This spin-coating is preferably used in combination with conventional LCD manufacturing techniques such as photolithography. Alternatively, capillary-coating could be used instead of spin-coating.

Deposited on the interior surface of the retardation films 50, 52, and 54 shown in FIG. 16 is a transparent conductive electrode (not shown) which acts as the second electrode for each color component or subpixel of the pixel 31. A power supply (not shown) is provided to apply a potential to the liquid crystal material 38 which occupies the region between the electrodes of the matrix 36 and the electrode layer (not shown) deposited on top of the retardation films. As will be clear and well-known to those skilled in the liquid crystal display art, the power supply (not shown) is typically used in conjunction with known addressing circuitry (not shown) for selectively applying a predetermined voltage to each of the color component unit or subpixel electrodes. In this manner, an image can be displayed by energizing selective subpixels and/or pixels.

The optical radiation, having been linearly polarized by the first polarizer 32, is rotated during transmission through the liquid crystal material 38 between the opposing electrodes. The twisted nematic cell 38 of this embodiment preferably rotates or twists the light about 82°–100°, although any degree of twist within a LC cell may be used in certain embodiments of this invention.

The optical radiation, after transmission through the liquid crystal material 38 with each color wavelength being retarded and/or twisted to a different extent, passes through the lower electrode (not shown), the color personalized retardation films 50, 52, and 54, and the optical color filters 42, 44, and 46. The optical filters select the color components to be transmitted by each subpixel of the liquid crystal pixel 31. After transmission through the color filters, the optical radiation is transmitted through the second transparent substrate 40 and finally, through the second or exit linear polarizer 56. After being transmitted through the second polarizer 56, the radiation is transmitted to an observer viewing the display.

Black matrix or shielding units 41 in certain embodiments of this invention are positioned between the color filters and are opaque to light thereby preventing unfiltered light from being transmitted through the pixel.

Both normally white and normally black liquid crystal displays may utilize certain embodiments of the present invention. In other words, the transmission axes of the polarizers 32 and 56 may be crossed in certain embodiments, thereby creating a normally white liquid crystal display pixel when the liquid crystal material 38 has about a conventional 90° twist. Alternatively, in certain embodiments of this invention the linear polarizers 32 and 56 may have their transmission axes arranged parallel to one another, thereby creating a normally black liquid crystal display pixel when the liquid crystal material 38 has about a conventional 90° twist in the OFF state. The orientation of the polarizers dictates the retardation value and orientation of retardation films to be used in the display. Also, it should be evident to those skilled in the art that super twisted (e.g. twisted angles of 90°–270°) liquid crystal displays, ECB displays, and homeotropic displays may also utilize the concepts set forth in particular embodiments of this invention.

When the optical radiation is transmitted at oblique angles through the pixel 31, the off axis transmission becomes increasingly elliptically polarized with angle, a result of the birefringence of the liquid crystal material. The birefringence of the liquid crystal material affects differently each particular wavelength of light (e.g. red, green, and blue wavelengths). The result of this elliptical polarization is non-uniformity of radiation contrast ratios as a function of angle about the normal axis after transmission of the radiation through the liquid crystal material 38. In order to compensate for the non-uniformity, the personalized retardation films 50, 52, and 54 are, in the second embodiment, interposed between the liquid crystal material 38 and the second substrate 40 as shown in FIG. 16. The presence of the retardation films results in a decrease in the elliptical polarization of the radiation applied to the second polarizer 56. Consequently, the uniformity of the radiation contrast ratios transmitted through the linear polarizing plate 56 is improved.

Because the birefringence of the liquid crystal material 38 affects differently each wavelength, the birefringence of each retardation film 50, 52, and 54 is personalized according to the color or wavelength of each subpixel. Accordingly, as a result of the personalization of the respective retardation films 50, 52, and 54, the leakage of each color (e.g., red, green, and blue) is substantially the same, one color relative to the others, throughout all viewing angles. Therefore, as a result of the personalization or patterning of the retardation films of each particular subpixel according to the wavelength of each subpixel, there is no longer the problem of having different relative color leakages at different viewing angles.

As should be evident from the above, the personalizing or patterning of the retardation films according to the color of each subpixel as taught by this invention satisfies two long felt needs in the liquid crystal display art. First, the personalization of the retardation films according to color improves the contrast ratio of each color at certain viewing angles and prevents excess leakages of one color relative to other colors at particular viewing angles (including the ON axis viewing angle). Secondly, the patterning or personalization of the retardation films of this invention compensates for the different wavelengths of the different colors and thereby eliminates the need to follow the multi-gap approach of matching the parameters $(d \cdot \Delta N) \div \lambda$ of each subpixel to the first transmission minimum of each color as taught by, for example, U.S. Pat. No. 4,632,514. As a result, the teachings of aforesaid mentioned U.S. Pat. No. 4,632,514 no longer need be followed in that the phase shift of the liquid crystal material is matched to the particular wavelength of each subpixel by personalizing the retardation films of the respective subpixels. The need for matching the thickness "d" of a liquid crystal material to the first transmission minimum of each color is eliminated by this invention because the personalized retardation films and their respective birefringent values and orientations compensate for the phase shift resulting from the elimination of matching the cell gap "d" to the first transmission minimum of each wavelength.

Furthermore, as will be recognized by those skilled in the art, the retardation films 50, 52, and 54 of certain embodiments of this invention may include one, two, or more layers immediately adjacent one another or spaced on opposite sides of the liquid crystal layer as is known throughout the art. For example, U.S. Pat. Nos. 5,150,235, 4,385,806, and 5,184,236, the disclosures of all of which are incorporated herein by reference, teach multi-layered retardation films which may be used within the confines of this invention. Accordingly, all of the retardation films described with respect to certain embodiments of this invention may consist of one, two, or more layers oriented according to the particular use intended for the resulting pixel. Furthermore, both uniaxial and biaxial retardation films may be used in conjunction with particular embodiments of this invention.

FIG. 17 illustrates a third embodiment of this invention. FIG. 17 is a cross sectional view illustrating a third embodiment of this invention wherein only the red and green subpixels of the pixel 31 are provided with retardation films, 80 and 81 respectively, personalized to the particular wavelength of each subpixel as discussed above. The blue subpixel is left alone without the company of a corresponding personalized retardation film.

However, in this third embodiment another retardation film or layer 60 having a constant retardation value is provided beneath the second transparent substrate 40 between the substrate 40 and the second polarizer 56. This additional retardation film or layer 60 behaves optically as any other conventional retardation film.

The retardation value of the retardation film 60 is added to the retardation values of the personalized retardation films within each subpixel. For example, as shown in the third embodiment illustrated in FIG. 17, if the retardation value of the personalized retardation film 80 of the red subpixel was 10 units, and the retardation value of the retardation film 60 located between the second substrate 40 and the polarizer 56 was 5 units, the total retardation value of the retardation films of the red subpixel would be 15 units.

It should also be apparent to those skilled in the art that the personalized retardation films in certain embodiments of this invention may all be located in a position similar to that of retardation film 60 shown in FIG. 17, outside of the substrates. Alternatively, in certain embodiments the personalized retardation films may also be positioned between the first polarizer 32 and the first substrate 34. Also, the retardation film 60 as shown in FIG. 5 may alternatively be positioned between the first polarizer 32 and the first substrate 34. Like the second embodiment, the third embodiment may be either a NB or a NW twisted nematic LCD, preferably with a cell twist in the OFF state of about 82°–100°.

FIG. 18 illustrates a fourth embodiment of this invention. FIG. 18 is a cross sectional view illustrating a twisted nematic LCD including a single personalized or patterned retardation film 62 which has an interior surface which is terraced defining different thicknesses for each particular subpixel. Alternatively, the exterior surface could instead be terraced. The thickness of the retardation film 62 in this particular embodiment is greatest in the red subpixel and smallest in the blue subpixel, thereby defining different retardation values for the retardation film 62 in the red, green, and blue subpixels which are matched to the particular wavelength of each corresponding subpixel.

Also shown in the fourth embodiment illustrated in FIG. 18, are a second electrode layer 64 deposited on the interior surface of the terraced retardation film 62, and a second orientation film 66 deposited on the interior surface of the second electrode layer 64. The transparent electrode film 64 and the transparent orientation film 66 are also preferably present in the other embodiments of this invention but have been omitted in the drawings for the purpose of simplicity. The electrode layer 64 combines with the matrix array 36 and electrodes therein to create a selectively activated voltage across each particular subpixel. A first orientation film (not shown) is disposed on the interior surface of the matrix array 36.

Each subpixel in certain embodiments of this invention preferably has about 7–9 possible gray level voltages. The same set of driving voltages may be used by each subpixel, or, alternatively, the set of gray level driving voltages for each subpixel may be chosen in accordance with the transmission versus voltage curve of that subpixel. The presence of the personalized retardation films of certain embodiments of this invention improves the gray level performance of the LCDs by minimizing the inversion.

The second orientation film 66 acts in combination with the first orientation film (not shown) deposited on the interior surface of matrix 36 in that they preferably orient the liquid crystal molecules of the LC layer 38 at angles perpendicular to one another thereby creating about a 90° twisted nematic liquid crystal cell. Like electrode layer 64, the orientation layer 66 and its corresponding first orientation layer (not shown) are present in certain other embodiments of this invention but are not illustrated in the drawings for purposes of simplicity.

The embodiment of FIG. 18 may, of course, be either a NW or NB type cell depending on the orientation of the transmission axes of the polarizers.

FIG. 19 illustrates a fifth embodiment of this invention. FIG. 19 is a cross sectional view illustrating a twisted nematic liquid crystal display wherein the personalized subpixel retardation films 67, 68, and 70 are made of different materials and therefore have different birefringent and retardation values. The retardation films and their respective birefringent values are chosen according to the wavelength of their corresponding subpixels. Therefore, this embodiment does not require the different retardation films to necessarily have different thicknesses although they still may, depending upon the materials chosen and requisite birefringent values of the retardation films. The retardation films 67, 68, and 70 of the blue, green, and red subpixels respectively, are located on the interior surface of the color filters 42, 44, and 46, and on the exterior surface of the electrode layer 64 and the orientation film 66. Like the other embodiments of this invention, this embodiment also may be provided with an additional retardation film located, for example, between the second substrate 40 and the second polarizer 56. Furthermore, it will be understood by those skilled in the art that the concept of this fifth embodiment wherein each retardation film is made of a different material having a different birefringent value may be applied to all other embodiments of this invention.

FIG. 20 illustrates a sixth embodiment of this invention. FIG. 20 is a cross sectional view of an embodiment of a twisted nematic LCD of this invention wherein the color filters 42, 44, and 46 of each subpixel of the pixel 31 are located on the second substrate 40, and wherein the retardation films 50, 52, and 54 of this embodiment are deposited on the interior surface of the first substrate 34 on either side of the matrix 36. Most preferably, the retardation films 50, 52, and 54 which are personalized according to the color of their respective subpixels, are disposed on the interior side of the matrix layer 36. The retardation films of this sixth embodiment correct the horizontal components of light before they enter the liquid crystal layer 38. It makes no difference whether the retardation films are located on the first substrate 34 or the second substrate 40.

FIG. 21 illustrates a seventh embodiment of this invention. FIG. 21 is a cross sectional view illustrating an embodiment of this invention wherein the retardation films 50, 52, and 54 of the twisted nematic LCD are disposed between their corresponding color filters 42, 44, and 46, and the second substrate 40. Again, the net result is the same whether or not the personalized retardation films are disposed below or above their corresponding color filters in each subpixel.

A distinct advantage of this invention is that the retardation films may be deposited directly on the color filters before assembly of the liquid crystal pixel thereby allowing a manufacturer to prefabricate the combination of the filter and the retardation film. For example, the retardation films 50, 52, and 54 may be spin coated onto color filters 42, 44, and 46 to a desired thickness and retardation value before the combination of the filter and retardation film is deposited or adhered to the corresponding substrate of the pixel. The soluble polyimides of U.S. Pat. No. 5,071,997 which have negative birefringent values are suitable for this purpose. This eliminates the need to deposit the retardation layers during manufacturing of the liquid crystal display pixel 31.

FIG. 22 is a cross sectional view of an eighth embodiment of this invention illustrating a nematic liquid crystal display wherein the color filters and retarders are combined into integrally formed elements 85–87. A single integrally formed polymer based element (85–87) functions both as a retarder and a color filter. This is accomplished by immersing conventional color filter dyes into a polyimide material which functions as a retarder. Soluble polyimides which may be used for this purpose are disclosed in U.S. Pat. No. 5,071,997, which was previously incorporated herein by reference. It is known that the organic solvent soluble polyimides of the '997 patent may be used as retardation films which have negative birefringent values. Conventional color dyes may be dissolved or immersed in these soluble polyimides thereby creating a single integrally formed polyimide based element 85–87 which functions as both a retarder and a color filter in a LCD. Color dyes which may be immersed or added to these polyimides are disclosed in U.S. Pat. No. 5,229,039, the disclosure of which is hereby incorporated herein by reference.

The retarder element of the retarders/filters 85–87 may or may not be personalized according to the wavelength of each subpixel in accordance with the teachings of the other embodiments of this invention. Furthermore, an integrally formed polymer-based element which functions as both a color filter and a retarder may be used in place of the separate filters and personalized retarders of certain previously discussed embodiments of this invention.

The polymer within which the color filter dye is immersed or dissolved is preferably a polyimide. The polyimide is preferably either a co-polyimide or a homopolyimide. The homopolyimide is preferably selected from the group consisting of: (i) a pyromellitic dianhydride (PMDA) and 2, 2'-bis (trifluoromethyl) benzidine (BTMB); (ii) 3, 3', 4, 4'-benzophenone tetracarboxylic dianhydride (BTDA) and 2, 2' bis (trifluoromethyl) benzidine (BTMB); (iii) 4, 4'-oxydiphthalic anhydride (ODPA) and 2, 2' bis (trifluoromethyl) benzidine (BTMB); (iv) 3, 3', 4, 4'-diphenylsu tetracarboxylic dianhydride (DSDA) and 2, 2' bis (trifluoromethyl) benzidine (BTMB); (v) 3, 3', 4, 4'-biphenyl tetracarboxylic dianhydride (BPDA) and 2, 2' bis (trifluoromethyl) benzidine (BTMB); and (vi) 2, 2'-bis (dicarbonylphenyl) hexafluoropropane dianhydride (6FDA) and 2, 2' bis (tri-fluoromethyl) benzidine (BTMB).

The co-polyimide is preferably based on a material selected from the group consisting of: (i) 3, 3', 4, 4'-benzophenone tetracarboxylic acid dianhydride (BTDA), 2, 2'-bis (trifluoromethyl) benzidine (BTMB) and 4, 4'-diaminodiphenyl ether (DDE); (ii) 3, 3', 4, 4' biphenyl tetracarboxylic dianhydride (BPDA), pyromellitic dianhydride (PMDA) and 2, 2'-bis (trifluoromethyl) benzidine (BTMB); and (iii) 3, 3+, 4, 4'-biphenyl tetracarboxylic dianhydride (BPDA), 2, 2'-bis (trifluoromethyl) benzidine (BTMB) and paraphenylene diamine (PPDA).

Furthermore, the polyimide is preferably organic solvent (e.g. m-cresol) soluble so as to simplify the process of immersing the color filter dye therein. Such a material may be obtained from the University of Akron.

The birefringent and retardation values of the retarder aspect of the polymer based elements 85–87 can be adjusted by the selection of materials and by increasing or decreasing the thickness thereof. Furthermore, each of the different polymer materials discussed above has a different birefringent value.

The color filter aspect of the polymer based elements 85–87 can be adjusted via the amount or type of dye immersed therein in accordance with conventional methods.

FIG. 23 is a partial cut-away view of an LCD including a plurality of pixels 310 of the different embodiments of this invention. The plurality of pixels 310 are sandwiched between opposing polarizers 312 and 314, and between opposing transparent substrates 316 and 318. A liquid crystal layer 320 is also disposed between the substrates and covers TFTs 322 which are used in the driving scheme of the pixels and subpixels of the different embodiments of this invention. Row and column lines 324 and 326 connect the TFTs 322. ITO electrodes 330 connect the TFTs to their respective pixels.

FIG. 24 is a graphic illustration of the angular relationship between the "horizontal" (X) and "vertical" (Y) viewing angles discussed herein, and the conventional LCD viewing angles $\phi$ and $\Theta$.

Once given the above disclosure, many other features, modifications and improvements will become apparent to the skilled artisan. Such other features, modifications, and improvements are, therefore, considered to be a part of this invention, the scope of which is to be determined by the following claims:

We claim:

1. A compensator for a liquid crystal display comprising:
   (a) a first deposited thin-film compensator layer having a first surface;
   (b) a second thin-film compensator layer deposited onto said first surface of said first compensator layer, wherein each of said first and said second deposited thin-film compensator layers are selected from the group consisting of: (i) a positively birefringent A-plate compensator layer, and (ii) a negatively birefringent C-plate compensator layer.

2. A liquid crystal display comprising:
   (a) a polarizer layer;
   (b) an analyzer layer;
   (c) a liquid crystal cell having a first transparent substrate and a second transparent substrate forming respective walls of said liquid crystal cell, said liquid crystal cell disposed between said polarizer layer and said analyzer layer; and
   (d) a compensator layer in accordance with claim 1 disposed between said polarizer layer and said analyzer layer.

3. A compensator element for a liquid crystal display comprising:
   (a) an optically transparent substrate; and
   (b) a compensator in accordance with claim 1, operatively coupled to said optically transparent substrate.

4. A compensator of claim 3, wherein said optically transparent substrate is one surface of a liquid crystal cell.

5. The compensator of claim 1, wherein another thin-film layer of material is deposited between said first deposited thin-film compensator layer and said second deposited thin-film layer.

6. The compensator of claim 5, wherein said another thin-film layer of material is a deposited thin-film compensator layer.

7. A compensator for a liquid crystal display comprising:
   (a) a first deposited thin-film compensator single layer having a first surface;
   (b) a second thin-film compensator single layer deposited onto said first surface of said first compensator layer, wherein each of said first and said second deposited thin-film compensator layers are selected from the group consisting of: (i) a positively birefringent A-plate compensator layer, and (ii) a negatively birefringent C-plate compensator layer.

* * * * *